US012515123B2

(12) United States Patent
Norton et al.

(10) Patent No.: US 12,515,123 B2
(45) Date of Patent: Jan. 6, 2026

(54) GAME CONTROLLER SYSTEM AND RELATED METHODS

(71) Applicant: Belkin International, Inc., El Segundo, CA (US)

(72) Inventors: John Norton, Santa Maria, CA (US); Rosanne Sanfilippo, Los Angeles, CA (US); Kenneth Mori, Los Angeles, CA (US); Steven Lane, Orange, CA (US); Aaron Ka Hoo Poon, Arcadia, CA (US); Stanley Cheung, Winnetka, CA (US); Seung Hyun Lim, Rolling Hills Estates, CA (US); Eric Lee, Cypress, CA (US); Vijendra Nalwad, Newbury Park, CA (US); Glenn Arche, Vista, CA (US)

(73) Assignee: BELKIN INTERNATIONAL, INC., El Segundo, CA (US)

( * ) Notice: Subject to any disclaimer, the term of this patent is extended or adjusted under 35 U.S.C. 154(b) by 532 days.

(21) Appl. No.: 17/951,555

(22) Filed: Sep. 23, 2022

(65) Prior Publication Data

US 2023/0097575 A1 Mar. 30, 2023

Related U.S. Application Data

(60) Provisional application No. 63/248,329, filed on Sep. 24, 2021.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
CPC ................................ A63F 13/98; A63F 13/24
See application file for complete search history.

(56) References Cited

U.S. PATENT DOCUMENTS

2001/0045938 A1 11/2001 Willner et al.
2009/0298590 A1 12/2009 Marks et al.
(Continued)

FOREIGN PATENT DOCUMENTS

CN 104436646 A 3/2015
JP 2018023796 A 2/2018
WO 2015012956 A1 1/2015

OTHER PUBLICATIONS

International Search Report and Written Opinion from PCT/US22/44589 dated Jan. 13, 2023.

*Primary Examiner* — Ryan Hsu
(74) *Attorney, Agent, or Firm* — BRYAN CAVE LEIGHTON PAISNER LLP

(57) ABSTRACT

A controller system including a first controller including one or more input controls and a connector. The controller system also can include a second controller including one or more input controls and a connector. The controller system additionally can include a bridge including a first connector at a first end of the bridge, a second connector at a second end of the bridge, and one or more hub connectors between the first end and the second end of the bridge. Each of the first connector, the second connector, and the one or more hub connectors can be a first connector type. Each of the connectors of the first controller and the second controller can be a second connector type configured to connect in a positionally secure manner with the first connector type. Other embodiments are described.

21 Claims, 23 Drawing Sheets

(56) References Cited

U.S. PATENT DOCUMENTS

| | | | | |
|---|---|---|---|---|
| 2010/0149740 | A1 | 6/2010 | Cheng | |
| 2010/0195279 | A1* | 8/2010 | Michael | G06F 1/1632<br>361/679.41 |
| 2014/0121023 | A1 | 5/2014 | Tahara et al. | |
| 2020/0269130 | A1* | 8/2020 | Provancher | A63F 13/24 |
| 2021/0197078 | A1 | 7/2021 | Yildiz et al. | |

* cited by examiner

GAME CONTROLLER SYSTEM AND RELATED METHODS

CROSS-REFERENCE TO RELATED APPLICATION

This application claims the benefit of U.S. Provisional Application No. 63/248,329, filed Sep. 24, 2021. U.S. Provisional Application No. 63/248,329 is incorporated herein by reference in its entirety.

TECHNICAL FIELD

This disclosure relates generally to game controllers and related systems and methods.

BACKGROUND

Video games are typically controlled by users using handheld controllers that may include various different physical controls, such as buttons, joysticks, directional pads, etc. Despite the many different genres of video games and/or the diverse types of roles that can be assumed in video games, the physical controls of the handheld controllers are generally in a fixed arrangement.

BRIEF DESCRIPTION OF THE DRAWINGS

To facilitate further description of the embodiments, the following drawings are provided in which:

FIG. 90 is a view of the rotation lock and the rotation cam, showing tabs of the rotation lock and detents of the rotation cam;

Figure 1:
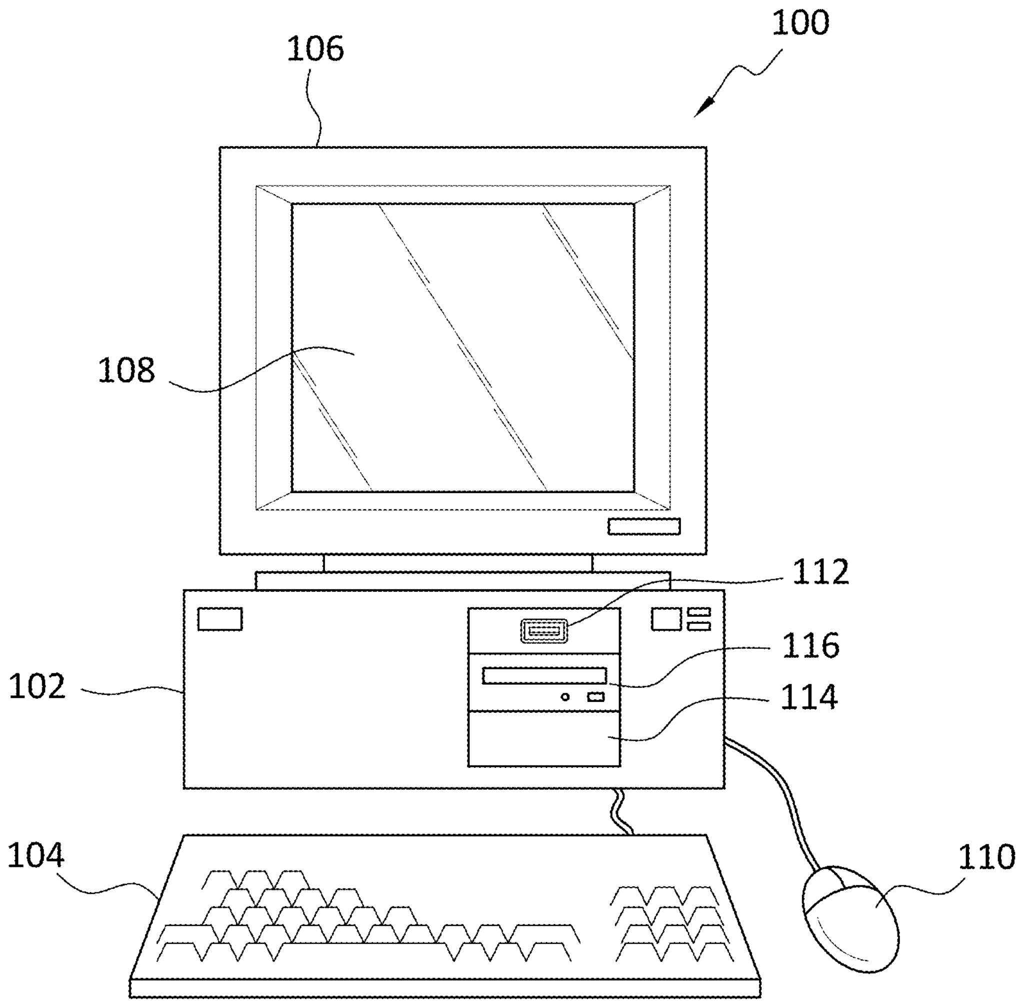
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a controller system including a first controller including one or more input controls and a connector. The controller system also can include a second controller including one or more input controls and a connector. The controller system additionally can include a bridge including a first connector at a first end of the bridge, a second connector at a second end of the bridge, and one or more hub connectors between the first end and the second end of the bridge. Each of the first connector, the second connector, and the one or more hub connectors can be a first connector type. Each of the connectors of the first controller and the second controller can be a second connector type configured to connect in a positionally secure manner with the first connector type.

A number of embodiments include a method of providing a controller system. The method can include providing a first controller including one or more input controls and a connector. The method also can include providing a second controller including one or more input controls and a connector. The method additionally can include providing a bridge including a first connector at a first end of the bridge, a second connector at a second end of the bridge, and one or more hub connectors between the first end and the second end of the bridge. Each of the first connector, the second connector, and the one or more hub connectors can be a first connector type. Each of the connectors of the first controller and the second controller can be a second connector type configured to connect in a positionally secure manner with the first connector type.

Additional embodiments include a method of using a controller system. The method can include connecting a first controller to a bridge. The first controller can include one or more input controls and a connector. The bridge can include a first connector at a first end of the bridge, a second connector at a second end of the bridge, and one or more hub connectors between the first end and the second end of the bridge. The method also can include connecting a second controller to the bridge. The second controller can include one or more input controls and a connector. Each of the first connector, the second connector, and the one or more hub connectors can be a first connector type. Each of the connectors of the first controller and the second controller can be a second connector type configured to connect in a positionally secure manner with the first connector type.

Figure 2:
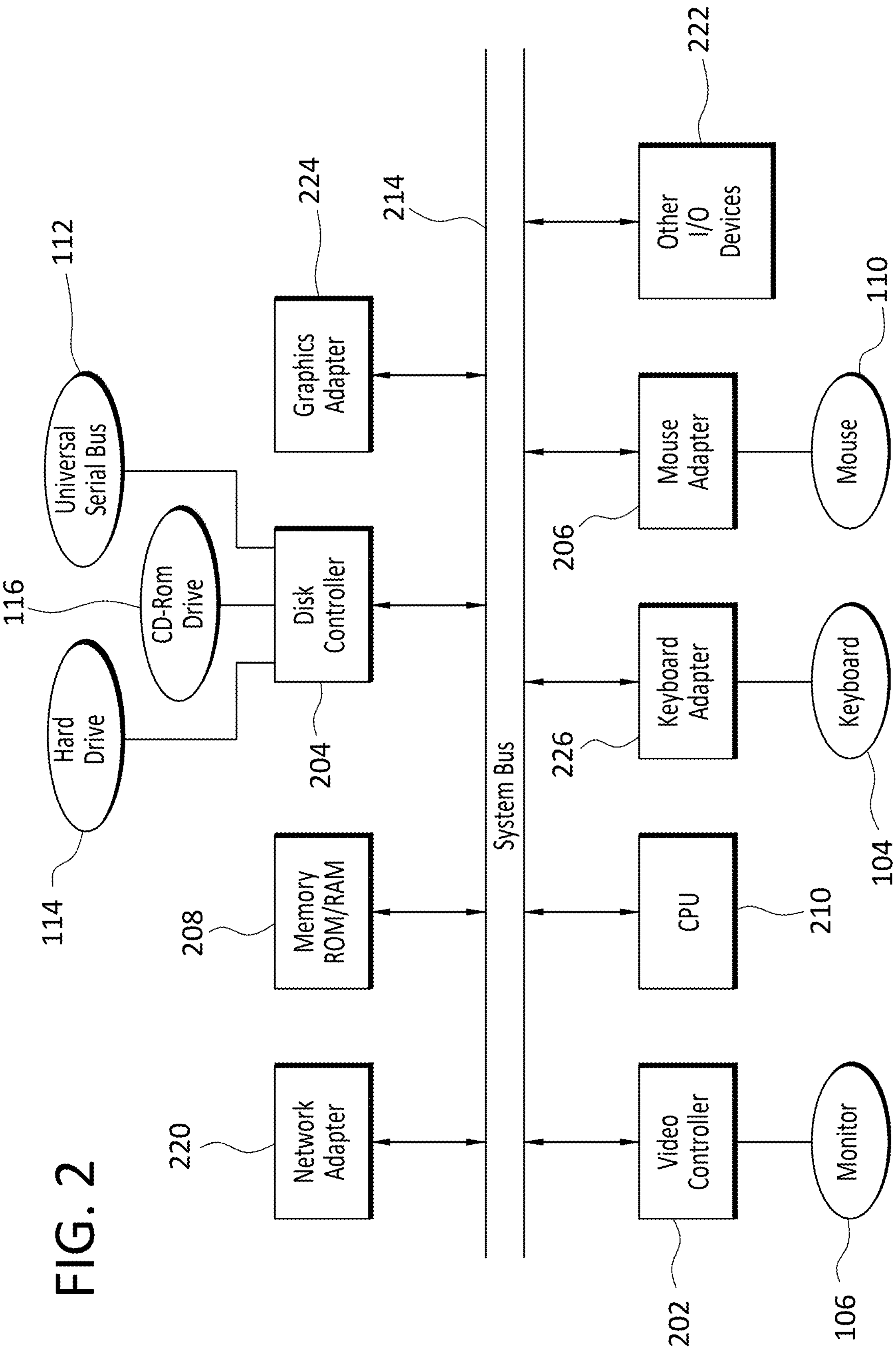
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems (ii) implementing and/or operating part or all of one or more embodiments of the non-transitory computer readable media described herein, and/or interfacing with one or more apparatuses described herein. As an example, a different or separate one of computer system 100 (and its internal components, or one or more elements of computer system 100) can be suitable for implementing part or all of the techniques described herein. In some embodiments, computer system 100 can include chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can include one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can include CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can include and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can include and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may include a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may include a portable computer, such as a laptop computer. In certain other embodiments, computer system 100 may include a mobile device, such as a smartphone. In certain additional embodiments, computer system 100 may include an embedded system.

Figure 3:
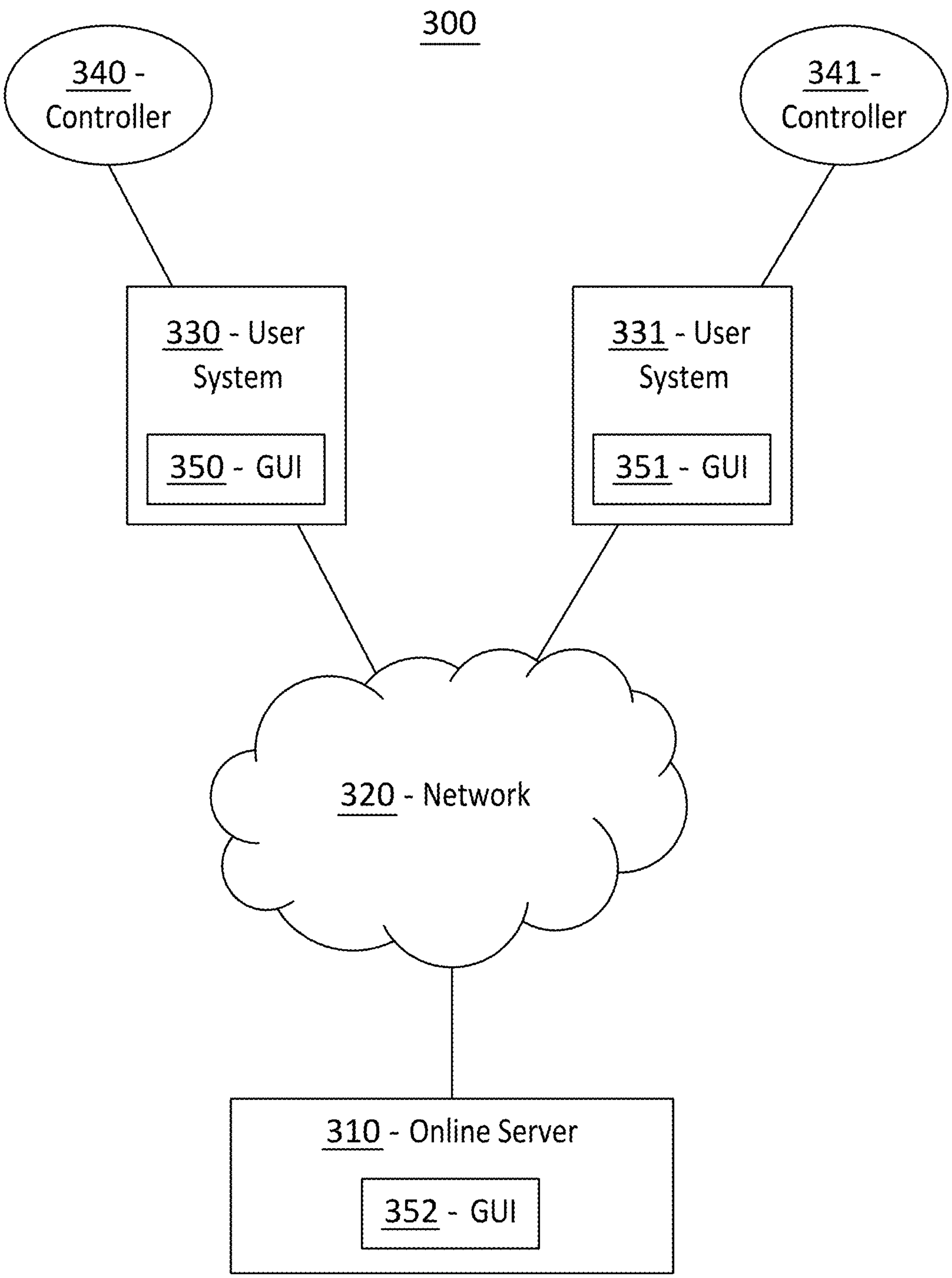
FIG. 3 illustrates a block diagram of a system that can be employed for use with a controller, according to an embodiment.

Turning ahead in the drawings, FIG. 3 illustrates a block diagram of a system 300 that can be employed for use with a controller, as described in greater detail below. System 300 is merely exemplary and embodiments of the system are not limited to the embodiments presented herein. System 300 can be employed in many different embodiments or examples not specifically depicted or described herein. In some embodiments, certain elements, modules, of systems of system 300 can perform various procedures, processes, and/or activities. In these or other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an online server 310, one or more user systems 330, 331, and/or one or more controllers 340, 341. Online server 310, user systems 330, 331, and/or controller 340, 341 can each be a computer system, such as computer system 100 (FIG. 1), as described above, or a portion thereof, and can each be a single computer, a single server, or a cluster or collection of computers or servers, or a cloud of computers or servers. In another embodiment, a single computer system can host each of two or more of online server 310, user system 330, 331, and/or controller 340, 341. In many embodiments, user systems 330, 331 can be video game consoles, such as Sony PlayStation, Microsoft Xbox, Nintendo Switch, Oculus Rift/Quest, etc, desktop and/or laptop computers, or other suitable systems with which controllers 340, 341 an interface. In many embodiments, online server 310 can be an online game/entertainment service, such as Sony PlayStation Network, a cloud gaming service, such as Google Stadia, or another suitable online service. Additional details regarding online server 310, user systems 330, 331, and/or controller 340, 341 are described herein.

In some embodiments, user systems 330, 331 can be external to system 300. User systems 330, 331 can include any of the elements described in relation to computer system 100 (FIG. 1). In some embodiments, user systems 330, 331 can be mobile devices. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can have a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can be an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can be a mobile device, and vice versa. However, a wearable user computer device is not necessarily a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the Apple Watch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America. In various embodiments, a head mountable wearable user computer device can include the Oculus® video game system by Facebook Technologies, LLC of Irvine CA, the Sony PlayStation VR by Sony® based out of Tokyo, Japan, the HTC Vive by HTC Corporation of New Taipei City, Taiwan, or some similar virtual reality or augmented reality apparatus.

In many embodiments, user systems 330-331 and online server 310 can include graphical user interface ("GUI") 350-352, respectively. In the same or different embodiments, GUI 350-352 can be part of and/or displayed by user computers 330-331, which also can be part of system 300. In some embodiments, GUI 350-352 can include text and/or graphics (image) based user interfaces. In the same or different embodiments, GUI 350-352 can include a heads up display ("HUD"). When GUI 350-352 includes a HUD, GUI 350-352 can be projected onto glass or plastic, displayed in midair as a hologram, or displayed on monitor 106 (FIG. 1). In various embodiments, GUI 350-352 can be color or black and white. In many embodiments, GUI 350-352 can include an application running on a computer system, such as computer system 100, user computers 330-331, and/or online server 310. In the same or different embodiments, GUI 350-352 can include a website accessed through a network 320 (e.g., the Internet). In some embodiments, GUI 350-352 can be displayed as or on a virtual reality (VR) and/or augmented reality (AR) system or display. In some embodiments, an interaction with a GUI can include a click, a look, a selection, a grab, a view, a purchase, a bid, a swipe, a pinch, a reverse pinch, etc.

In some embodiments, online server 310 can be in data communication through network 320 with user systems 330, 331. In certain embodiments, user systems 330, 331 can be desktop computers, laptop computers, smart phones, tablet devices, video game devices, and/or other endpoint devices.

In many embodiments, online server 310, user systems 330, 331, and/or controller 340, 341 can each include one or more input devices (e.g., one or more keyboards, one or more keypads, one or more pointing devices such as a computer mouse or computer mice, one or more touchscreen displays, a microphone, one or more controllers etc.), and/or can each include one or more display devices (e.g., one or more monitors, one or more touch screen displays, projectors, etc.). In these or other embodiments, one or more of the input device(s) can be similar or identical to keyboard 104 (FIG. 1), a mouse 110 (FIG. 1), controllers 400, and/or bridge 500. Further, one or more of the display device(s) can be similar or identical to monitor 106 (FIG. 1) and/or screen 108 (FIG. 1). The input device(s) and the display device(s) can be coupled to the processor(s) and/or the memory storage unit(s) of online server 310, user systems 330, 331, and/or controller 340, 341 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of online server 310, user systems 330, 331, and/or controller 340, 341. In a similar manner, the processor(s) and the memory storage unit(s) can be local and/or remote to each other.

In some embodiments, online server 310, user systems 330, 331, and/or controller 340, 341 can communicate or interface (e.g., interact) with each other through a network 320. Network 320 can be an intranet that is not open to the public. In further embodiments, Network 320 can be a mesh network of individual systems. Accordingly, in many embodiments, online server 310, user systems 330, 331, and/or controller 340, 341 (and/or the software used by such systems) can refer to a back end of system 300 operated by an operator and/or administrator of system 300, and user systems 330, 331 (and/or the software used by such systems) can refer to a front end of system 300 used by one or more users. In some embodiments, users can also be referred to as customers, in which case, user systems 330, 331 can be referred to as customer computers. In these or other embodiments, the operator and/or administrator of system 300 can manage system 300, the processor(s) of system 300, and/or the memory storage unit(s) of system 300 using the input device(s) and/or display device(s) of system 300. For example, an administrator can adjust one or more predetermined thresholds as described herein.

Meanwhile, in many embodiments, online server 310, user systems 330, 331, and/or controller 340, 341 also can be configured to communicate with one or more databases. The one or more databases can be stored on one or more memory storage units (e.g., non-transitory memory storage units(s)), which can be similar or identical to the one or more memory storage units(s) (e.g., non-transitory memory storage media) described above with respect to computer system 100 (FIG. 1). Also, in some embodiments, for any particular database of the one or more databases, that particular database can be stored on a single memory storage unit of the memory storage unit(s), and/or the non-transitory memory storage unit(s) storing the one or more databases or the contents of that particular database can be spread across multiple ones of the memory storage unit(s) and/or non-transitory memory storage unit(s) storing the one or more databases, depending on the size of the particular database and/or the storage capacity of the memory storage unit(s) and/or non-transitory memory storage unit(s).

The one or more databases can each include a structured (e.g., indexed) collection of data and can be managed by any suitable database management systems configured to define, create, query, organize, update, and manage database(s).

Exemplary database management systems can include MySQL (Structured Query Language) Database, PostgreSQL Database, Microsoft SQL Server Database, Oracle Database, SAP (Systems, Applications, & Products) Database, and/or IBM DB2 Database.

Meanwhile, communication between online server 310, user systems 330, 331, controller 340, 341, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), I Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
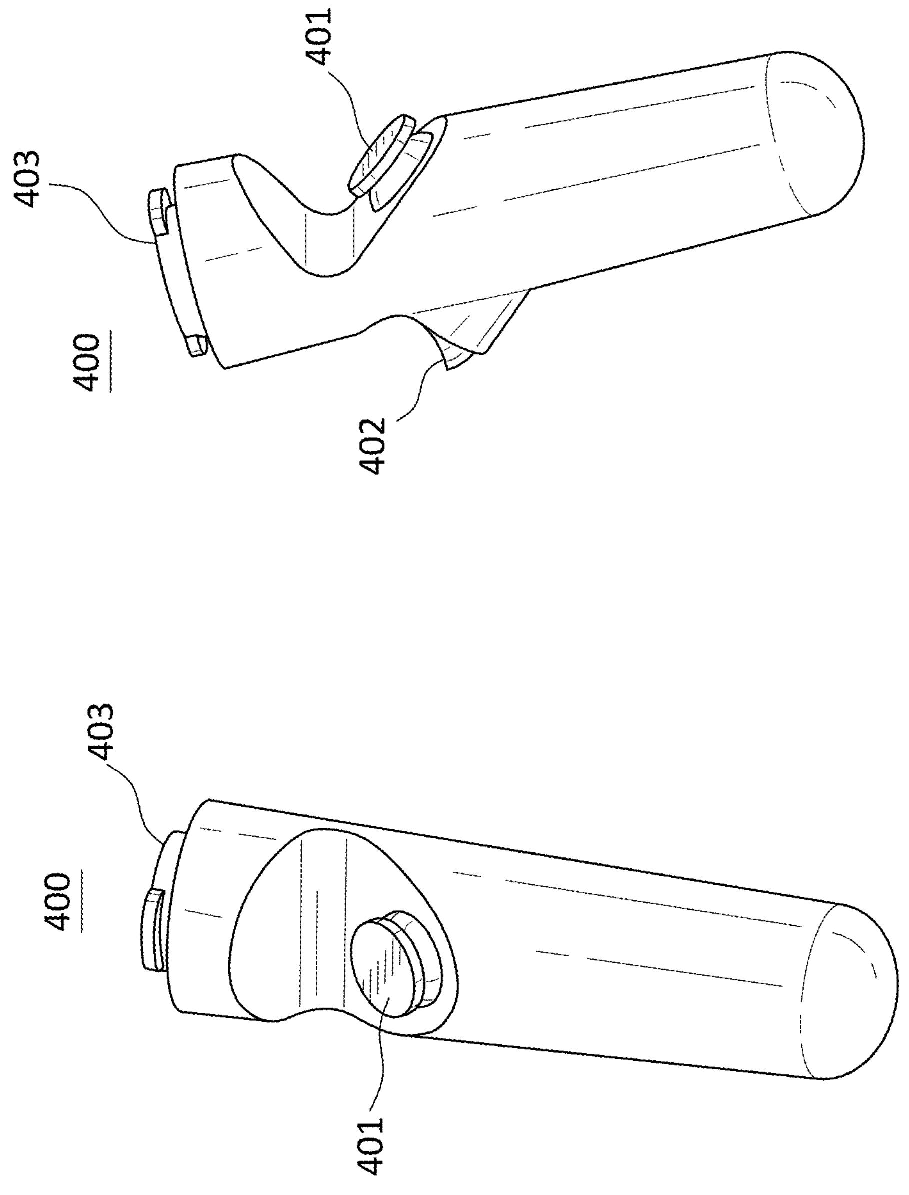
FIG. 4 illustrates an exemplary controllers, according to an embodiment.

Turning now to FIG. 4, an exemplary controller 400 is shown, which can be an embodiment of at least a portion of controllers 340 or 341 (FIG. 3). Controller 400 is not limited to the embodiments described herein, and a person having ordinary skill in the art will understand that one or more elements of controller 400 can be modified, altered, or substituted with other elements described in this disclosure. In many embodiments controller 400 can be referred to as a handle controller. In some embodiments, controller 400 can have a length configured to fit fully or partially within a user's hand grip, such as between approximately 3 inches (7.62 centimeters (cm)) and approximately 6 inches (15.24 cm). In various embodiments, controller 400 can comprise a two dimensional input 401, a one dimensional input 402, and/or a locking connector 403. Generally speaking, controller 400 can be tubular in shape with one or more rounded ends, one or more flat ends, one or more cutouts, and/or one or more raised surfaces or edges. In various embodiments, one or more cutouts and/or one or more raised surfaces or edges can be configured to house one or more inputs (e.g., two dimensional input 401 and/or one dimensional input 402). In these or other embodiments, one or more cutouts and/or one or more raised surfaces or edges can be ergonomic in nature and aid in gripping controller 400.

In some embodiments, two dimensional input 401 can comprise an input having at least two dimensions (e.g., an X and a Y dimension). For example, if two dimensional input 401 is a joystick (as shown in FIG. 4), then the two dimensions of input can comprise left/right and up/down on the joystick. In many embodiments, two dimensional input 401 can comprise a touch pad, a touch screen, a joystick, a directional pad, and/or one or more one dimensional inputs in an arrangement that allows for two dimensions (e.g., four buttons arranged in a box or diamond pattern). In some embodiments, one or more two dimensional inputs can be configured to perform additional inputs. For example, a joystick can be depressed or raised; a touch pad can be tapped, swiped, pinched etc.; and a touch screen can be configured to display various GUIs or prompts to guide a user through various tasks (e.g., pairing or calibrating controller 400).

In many embodiments, one dimensional input 402 can comprise an input having at least one dimension (e.g., a Z dimension). For example, one dimensional input 402 can comprise one or more buttons, triggers, paddles, etc. In further embodiments, a one dimensional input can comprise a potentiometer configured to indicate an amount moved in the one dimension. For example, a potentiometer can indicate whether a trigger has been pushed halfway or completely.

Figure 5:
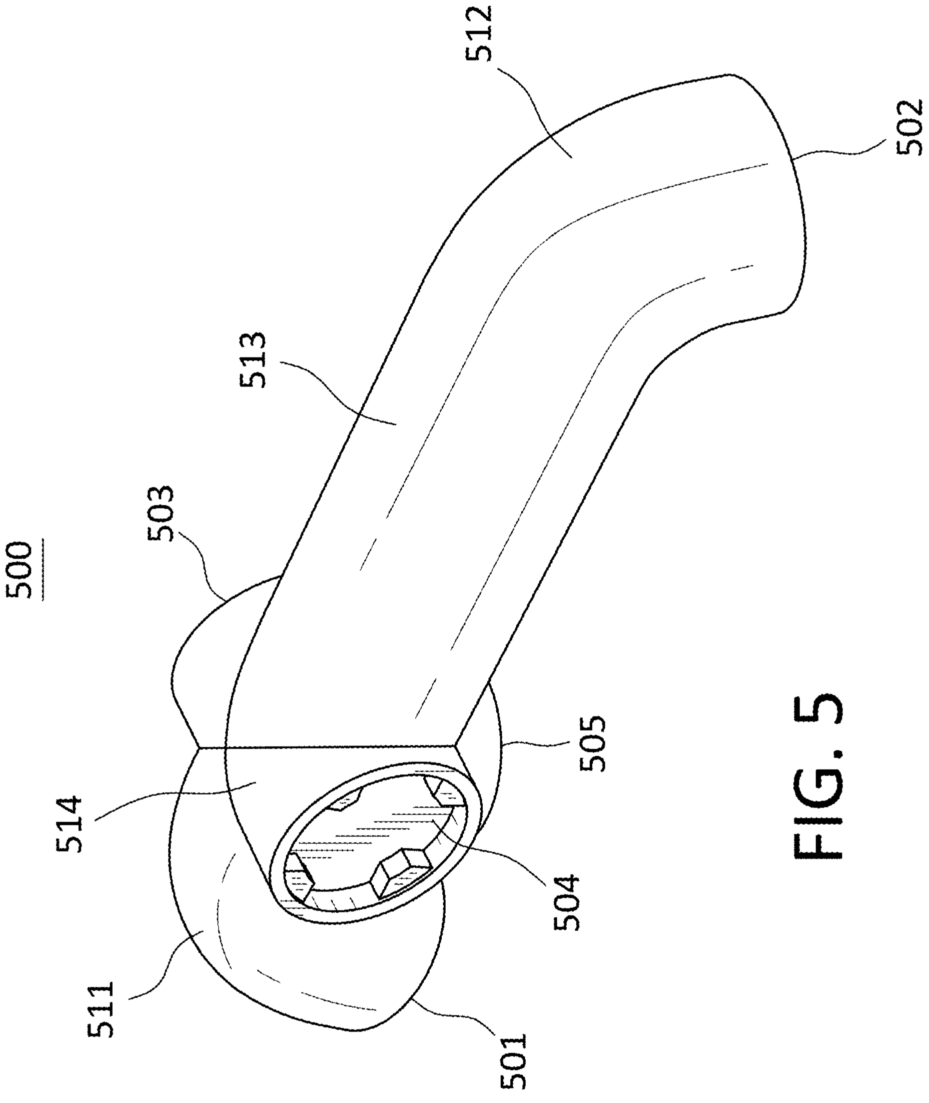
FIG. 5 illustrates an exemplary bridge, according to an embodiment.

In various embodiments, two dimensional input 401 can be located along various rotational arcs and lengths from one dimensional input 402 (or vice versa). For example, two dimensional input 401 can be 180 degrees and on the same plane as one dimensional input 402 as shown in FIG. 4. In other embodiments, the placement and presence of two dimensional input 401 and one dimensional input 402 can be altered to better adapt to the abilities of a specific user. For example, two dimensional input 401 and one dimensional input 402 can be added, moved, or removed to better accommodate users with disabilities. In these or other embodiments, one or more of two dimensional input 401 and/or one dimensional input 402 can be configured to be rotated within the housing of controller 400. In many embodiments, controller 400 can comprise a locking connector 403. In some embodiments, locking connector 403 can comprise a male or a female locking connector. Generally speaking, locking connector 403 can be complementary to locking connectors 501-505 (FIG. 5, described below) thereby allowing controller 400 to be coupled to bridge 500 (FIG. 5). For example, controller 400 has a male locking connector 403 while bridge 500 (FIG. 5) has a plurality of female locking connectors 501-505, or vice versa. More details about locking connector 403 are described below with reference to FIGS. 8-10D.

Turning now to FIG. 5, an exemplary bridge 500 is shown, which can be an embodiment of at least a portion of controllers 340 or 341 (FIG. 3). Bridge 500 is not limited to the embodiments described herein, and a person having ordinary skill in the art will understand that one or more elements of bridge 500 can be modified, altered, or substituted with other elements described in this disclosure. In many embodiments, bridge 500 can be referred to as a bridge. Generally speaking, bridge 500 can have a tubular body comprising a central straight region 513 one or more bends 511-512. In some embodiments, bends 511-512 can have an interior angle of approximately 120 degrees, as shown in FIG. 5, or in some embodiments, can have an interior angle between 90 and 180 degrees, depending on the specific configuration. In various embodiments an interior angle of a bend can be adjusted via a hinge, ball and socket, or some other joint embedded in the bend. In some embodiments, the length of central straight region 513 can be approximately 3 inches (7.62 cm) to approximately 24 inches (60.96 cm). For example, as shown in FIG. 5, central straight region 513 (between bends 511 and 512) can be approximately 6 inches (15.24 cm).

In further embodiments, bridge 500 can comprise one or more locking connectors 501-505. For example, as shown in FIG. 5, bridge 500 can include a locking connector 501 at a first end of bridge 500 proximate to bend 511, a locking connector 502 at a second end of bridge 500 proximate to bend 512, and a locking connector hub 514, which can include locking connectors 503-505. In some embodiments, as shown in FIG. 5, locking connector hub 514 can be located along central straight region 513, and can be located closer to bend 511 than bend 512. In other embodiments, locking connector hub 514 can be centrally located on central straight region 513 at an approximate midpoint between bends 511 and 512. As shown in FIG. 5, locking connector 503 and 504 can be located at opposite sides of central straight region 513 and facing outwards at approximately 180 degrees from each other, and locking connector 505 can be located between locking connectors 503-504, but facing downward, In other embodiments, locking connectors 503-505 on locking connector hub can be positioned in other suitable positions, and/or the locking connector hub can include more or fewer locking connectors. In some embodiments, locking connectors 501-505 can be configured to rotate to achieve different configurations. For example, the locking connector hub 514 shown in bridge 500 can be rotated so that at least one locking connector is facing up. As described in further detail below, combining one or more embodiments of controller 400 with one or more embodiments of bridge 500 can lead to different functionalities and/or usable configurations.

In many embodiments, controllers 400 (FIG. 4) and/or 500 can comprise a number of internal components not visible in FIGS. 4-5. For example, controllers 400 (FIG. 4) and/or 500 can comprise one or more accelerometers and/or gyroscopes configured to aid in tracking movement of the controller through space. In many embodiments, one or more input mechanisms can be removable and/or replaceable. For example, a joystick can be removed as one whole module or an outer shell of the controller can be disassembled so that a gyroscope can be replaced. In various embodiments, one or more haptic feedback mechanisms can be located in an interior of a controller. For example, motors or transducers can generate a vibration that is synchronized with events happening in a video game. If a controller is used in a motorcycle simulation, varying vibrations can be felt as the user changes a throttle setting or travels over uneven virtual roadways. A larger bump type of haptic feedback can occur when a user lands a jump in the motorcycle simulation. In many embodiments, haptic drivers reside in different portions of a controller to provide a directionality of haptic events. For example, handle (e.g., 400 (FIG. 4)) and/or bridge (e.g., 500) elements of a controller can respond to signals received from a video game system to indicate that an event is happening to the right or left of the user.

Turning now to FIGS. 6A-6D, an exemplary controller system 600, according to another embodiment, is shown in four different configurations. Controller system 600 can be an embodiment of controllers 340 or 341 (FIG. 3). Controller system 600 is not limited to the embodiments described herein, and a person having ordinary skill in the art will understand that one or more elements of controller system 600 can be modified, altered, or substituted with other elements described in this disclosure. For example, although controller system 600 is shown using two of controllers 400 and one of bridge 500, other suitable permutations of controllers 400 and/or bridge 500 could also be used in different configurations. In many embodiments, the same two controllers 400 (handle controllers) and one bridge 500 can be rearranged in the various different configurations shown in FIGS. 6A-6D, for use in different game functions. In general, when controller system 600 is used, a left hand of the user can be placed on a first one of controllers 400, and a right hand of the user can be placed on a second one of controllers 400, and bridge 500 can join the two controllers 400 in various different configurations. In many embodiments, reconfiguration of controller system 600 into the various different configurations, such as the configurations shown in FIGS. 6A-6D, can readily occur by moving locking connectors 403 of one or more of controllers 400 to different locking connectors (e.g., 501-505) of bridge 500.

Figure 6B:
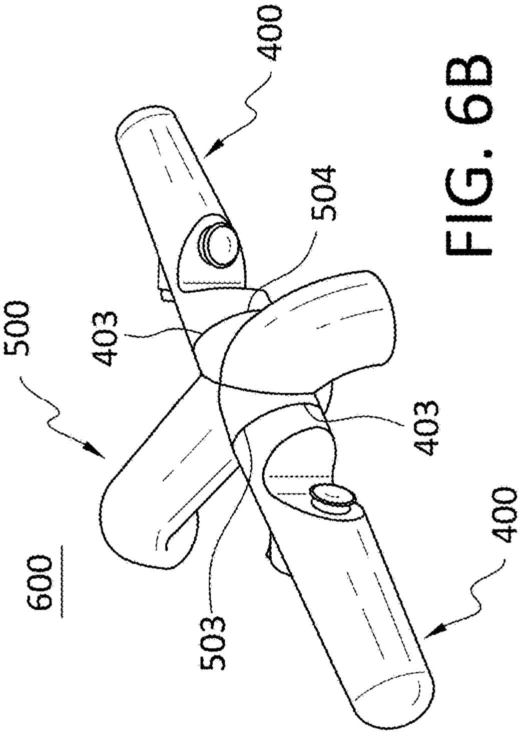
FIG. 6B illustrates the controller system of FIG. 6A in a motorcycle mode.
Figure 6D:
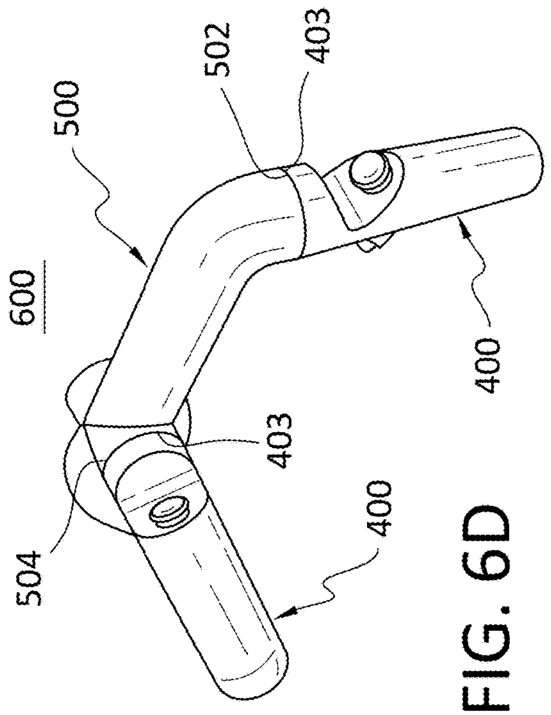
FIG. 6D illustrates a controller system of FIG. 6A in a chainsaw mode.
Figure 6A:
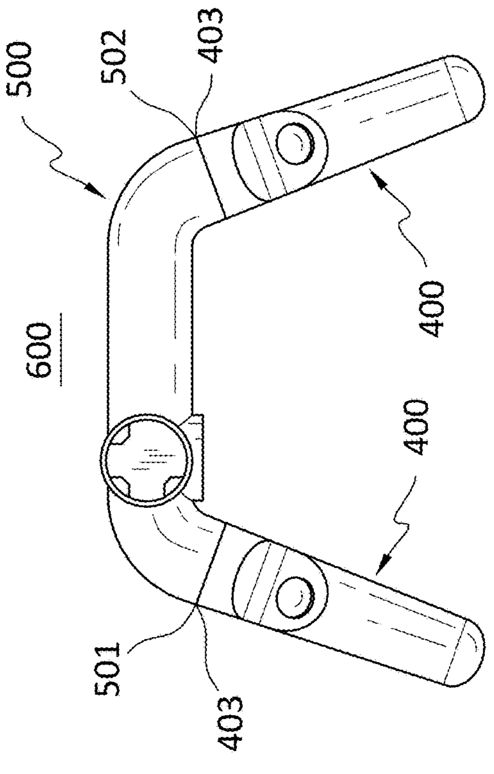
FIG. 6A illustrates a controller system in a steering wheel mode, according to an embodiment.

For example, as shown in FIG. 6A, controller system 600 can be configured such that locking connector 403 of a first one of controller 400 is coupled at locking connector 503 of bridge 500, and locking connector 403 of a second one of controller 400 is coupled at locking connector 502 of bridge 500. In such a configuration, the controllers 400 (handle controller) can be angled at approximately 60 degrees with respect to each other, as shown in FIG. 6A, or at another suitable angle between parallel (both facing downward) and in line (both facing outward, depending on the bend (e.g., 511-512 (FIG. 5) in bridge 500. The configuration of controller system 600 shown in FIG. 6A can be used for various applications, such as a gamepad, or a steering wheel, for example. In this configuration, the controller can be referred to as in steering wheel mode, for example.

As shown in FIG. 6B, controller system 600 can be configured such that locking connector 403 of a first one of controller 400 is coupled at locking connector 503 of bridge 500, and locking connector 403 of a second one of controller 400 is coupled at locking connector 504 of bridge 500. In such a configuration, the controllers 400 (handle controllers) can be angled at approximately 180 degrees with respect to each other, as shown in FIG. 6B, or at another suitable angle between parallel (both facing downward) and in line (both facing outward, depending on the bend (e.g., 511-512 (FIG. 5) in bridge 500. The configuration of controller system 600 shown in FIG. 6B can be used for various applications, such as a bicycle, motorcycle, or forklift, for example. In this configuration, the controller can be referred to as in motorcycle mode, for example.

Figure 6C:
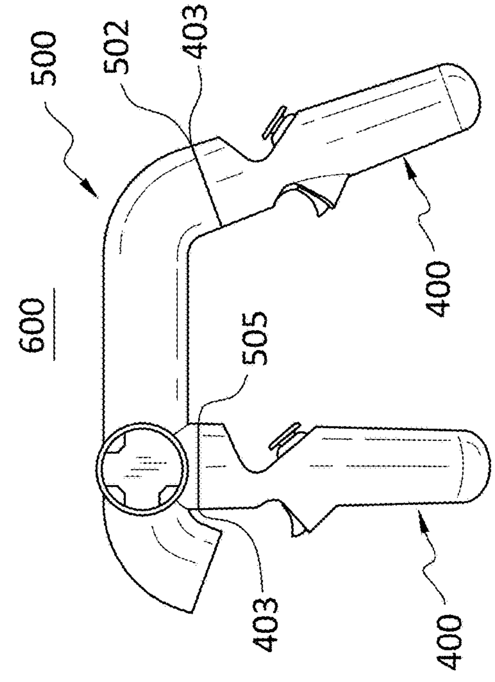
FIG. 6C illustrates a controller system of FIG. 6A in a gun mode.

As shown in FIG. 6C, controller system 600 can be configured such that locking connector 403 of a first one of controller 400 is coupled at locking connector 502 of bridge 500, and locking connector 403 of a second one of controller 400 is coupled at locking connector 505 of bridge 500. In such a configuration, the controllers 400 (handle controllers) can be angled at approximately 45 degrees with respect to each other, as shown in FIG. 6C, or at another suitable angle between parallel (both facing downward) and in line (both facing outward, depending on the bend (e.g., 511-512 (FIG. 5) in bridge 500. The configuration of controller system 600 shown in FIG. 6C can be used for various applications, such as a gun or rocket launcher, for example. In this configuration, the controller can be referred to as in gun mode, for example.

As shown in FIG. 6D, controller system 600 can be configured such that locking connector 403 of a first one of controller 400 is coupled at locking connector 502 of bridge 500, and locking connector 403 of a second one of controller 400 is coupled at locking connector 504 of bridge 500. In such a configuration, the controllers 400 (handle controllers) can be angled at approximately 45 degrees and rotated approximately 90 degrees with respect to each other, as shown in FIG. 6D, or at another suitable angle between parallel (both facing downward) and in line (both facing outward, depending on the rotation of locking connector 504. The configuration of controller system 600 shown in FIG. 6D can be used for various applications, such as a chainsaw or a Gatling gun, for example. In this configuration, the controller can be referred to as in chainsaw mode, for example.

Turning now to FIGS. 7A-7E, five different configurations of an exemplary controller system 700 are shown. Controller system 700 can be an embodiment of controllers 340 or 341 (FIG. 3). Controller system 700 is not limited to the embodiments described herein, and a person having ordinary skill in the art will understand that one or more elements of controller system 700 can be modified, altered, or substituted with other elements described in this disclosure. For example, controller system 700 can include two of controllers 400, a bridge 710, and/or zero, one, or more of elbow pieces 720, and other suitable permutations of controller 400, bridge 710, and/or elbow pieces 720 could also be used for other configurations. In many embodiments, controller system 700 can be created using two controller 400, zero, one, two, or in some embodiments, more than two, of elbow pieces 720, and bridge 710. In various embodiments, an elbow piece 720 can be shaped and function similar or identical to the bend (e.g., 511-512 (FIG. 5)) discussed above with reference to FIG. 5, but elbow piece 720 can include locking connectors 721 and 722. In many embodiments, the dimensions of bridge 710 and elbow pieces 720 attached to each side of bridge 710 can form a structural element similar to bridge 500 (FIG. 5), which can have similar or identical dimensions. As compared to bridge 500 (FIG. 5), bridge 710 can include two locking connectors 713 and 714 in a hub 715 offset from a center of bridge 710, and can include locking connectors 711 and 712 at the ends of bridge 710. Controller system 700 can allow for additional configurations using elbow pieces 720. A number of these configurations are shown in FIGS. 7A-7E. In many embodiments, reconfiguration of controller system 700 into the various different configurations, such as the configurations shown in FIGS. 7A-7E, can readily occur by using or not using elbow pieces 720, and/or moving locking connectors 403 of one or more of controllers 400 to different locking connectors (e.g., 711-714) of bridge 710 or different locking connectors (e.g., 721-722) of elbow pieces 720.

Figures 7A, 7B, 7C, 7D, 7E:
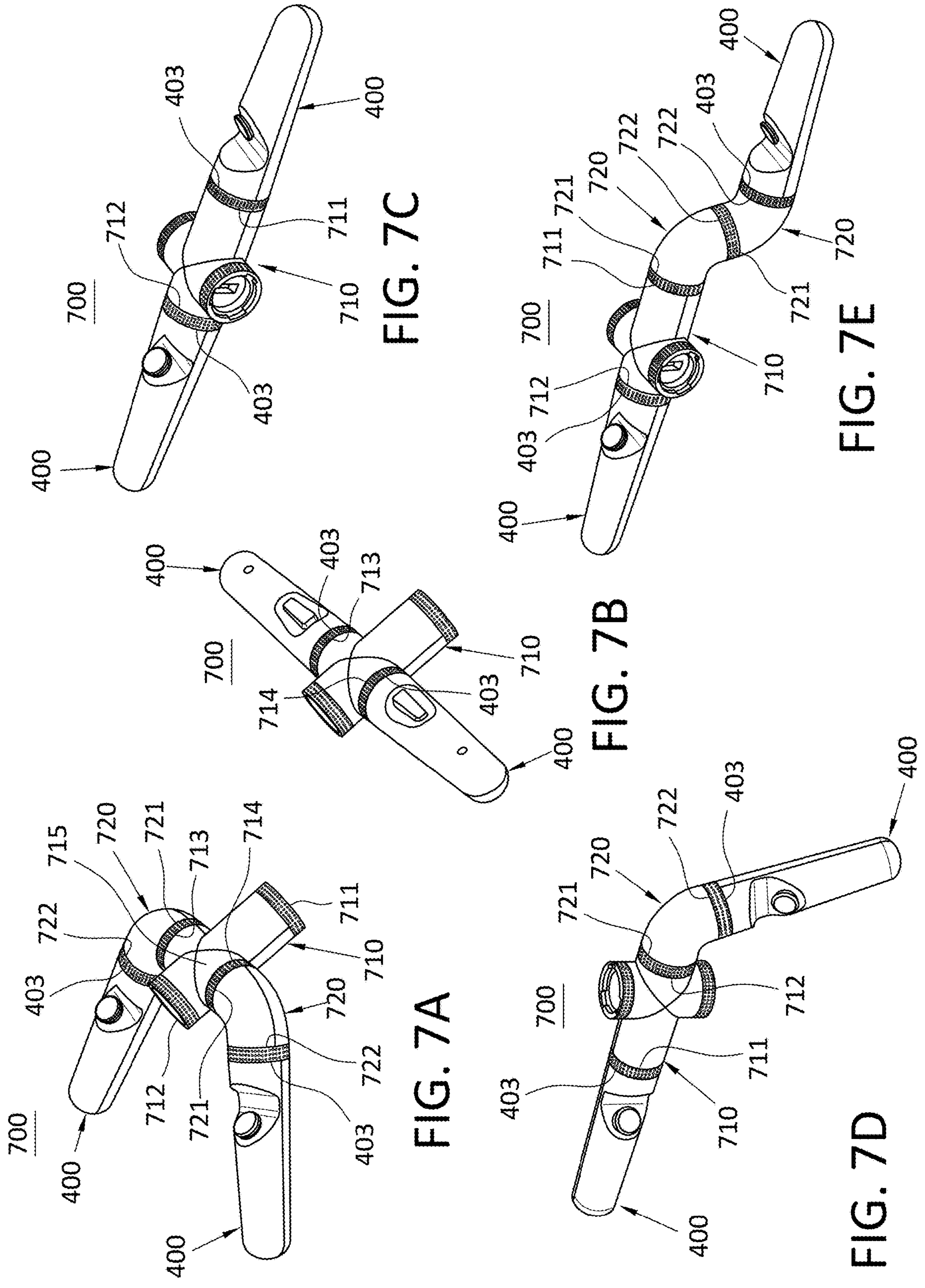
FIG. 7A illustrates a controller system in a steering wheel mode, according to another embodiment.
FIG. 7B illustrates the controller system of FIG. 7A in a handlebar mode.
FIG. 7C illustrates the controller system of FIG. 7A in a sword mode.
FIG. 7D illustrates the controller system of FIG. 7A in a rifle mode.
FIG. 7E illustrates the controller system of FIG. 7A in a machine gun mode.

For example, as shown in FIG. 7A, controller system 700 can be configured such that locking connector 403 of a first one of controller 400 is coupled at locking connector 722 of a first one of elbow piece 720, locking connector 403 of a second one of controller 400 is coupled at locking connector 722 of a second one of elbow piece 720, locking connector 721 of the first one of elbow piece 720 is coupled at locking connector 713 of bridge 710, and locking connector 721 of the second one of elbow piece 720 is coupled at locking connector 714 of bridge 710. In such a configuration, the controllers 400 (handle controllers) can be angled at approximately 60 degrees with respect to each other, as shown in FIG. 7A, or at another suitable angle. The configuration of controller system 700 shown in FIG. 7A can be used for various applications, such as a gamepad, or a steering wheel, for example. In this configuration, the controller can be referred to as in steering wheel mode, for example.

As shown in FIG. 7B, controller system 700 can be configured such that controllers 400 are coupled directly to bridge 710, without using elbow pieces 720. For example, locking connector 403 of a first one of controller 400 can be connected to locking connector 714 of bridge 710, and locking connector 403 of a second one of controller 400 can be connected to locking connector 713 of bridge 710. In such a configuration, the controllers 400 (handle controllers) can be positioned in-line and opposite each other (e.g., approximately 180 degrees from each other) on opposite sides of bridge 710. The configuration of controller system 700 shown in FIG. 7B can be used for various applications, such as a motorcycle handlebar, for example. In this configuration, the controller can be referred to as in handlebar mode, for example.

As shown in FIG. 7C, controller system 700 can be configured such that controllers 400 are coupled directly to bridge 710, without using elbow pieces 720. For example, locking connector 403 of a first one of controller 400 can be connected to locking connector 711 of bridge 710, and locking connector 403 of a second one of controller 400 can be connected to locking connector 712 of bridge 710. In such a configuration, the controllers 400 (handle controllers) can be positioned in-line and opposite each other (e.g., approximately 180 degrees from each other) on opposite sides of bridge 710, but can be further apart from each other than in the configuration shown in FIG. 7B. The configuration of controller system 700 shown in FIG. 7C can be used for various applications, such as a spear or sword, for example. In this configuration, the controller can be referred to as in sword mode, for example.

As shown in FIG. 7D, controller system 700 can include one elbow piece 720, and can be configured such that locking connector 403 of a first one of controller 400 is coupled at locking connector 722 of a first one of elbow piece 720, locking connector 403 of a second one of controller 400 is coupled at locking connector 711 of a bridge 710, and locking connector 721 of the first one of elbow piece 720 is coupled at locking connector 712 of bridge 710. In such a configuration, the controllers 400 (handle controllers) can be angled at approximately 150 degrees with respect to each other, as shown in FIG. 7D, or at another suitable angle. The configuration of controller system 700 shown in FIG. 7D can be used for various applications, such as a handgun or a rifle, for example. In this configuration, the controller can be referred to as in rifle mode, for example.

As shown in FIG. 7E, controller system 700 can include two elbow pieces 720, and can be configured such that locking connector 403 of a first one of controller 400 is coupled at locking connector 722 of a first one of elbow piece 720, locking connector 721 of the first one of elbow piece 720 is coupled at locking connector 722 of a second one of elbow piece 720, locking connector 403 of a second one of controller 400 is coupled at locking connector 712 of a bridge 710, and locking connector 721 of the second one of elbow piece 720 is coupled at locking connector 711 of bridge 710. In such a configuration, the controllers 400 (handle controllers) can be angled at approximately 180 degrees and on separate planes with respect to each other, as shown in FIG. 7E, or at another suitable angle. The configuration of controller system 700 shown in FIG. 7E can be used for various applications, such as a machine gun or a spear, for example. In this configuration, the controller can be referred to as in machine gun mode, for example.

In many embodiments, a controller or controller system can be handheld. In the same or other embodiments, a controller or controller system can be mounted on various areas of a user's body. For example, a controller can be mounted to a head, an ankle, a foot, a wrist, a hand, a waist, a neck, etc. Mounted controllers can then communicate with each other and a video game system wirelessly through communication methods (e.g., as Bluetooth Mesh).

Figure 8:
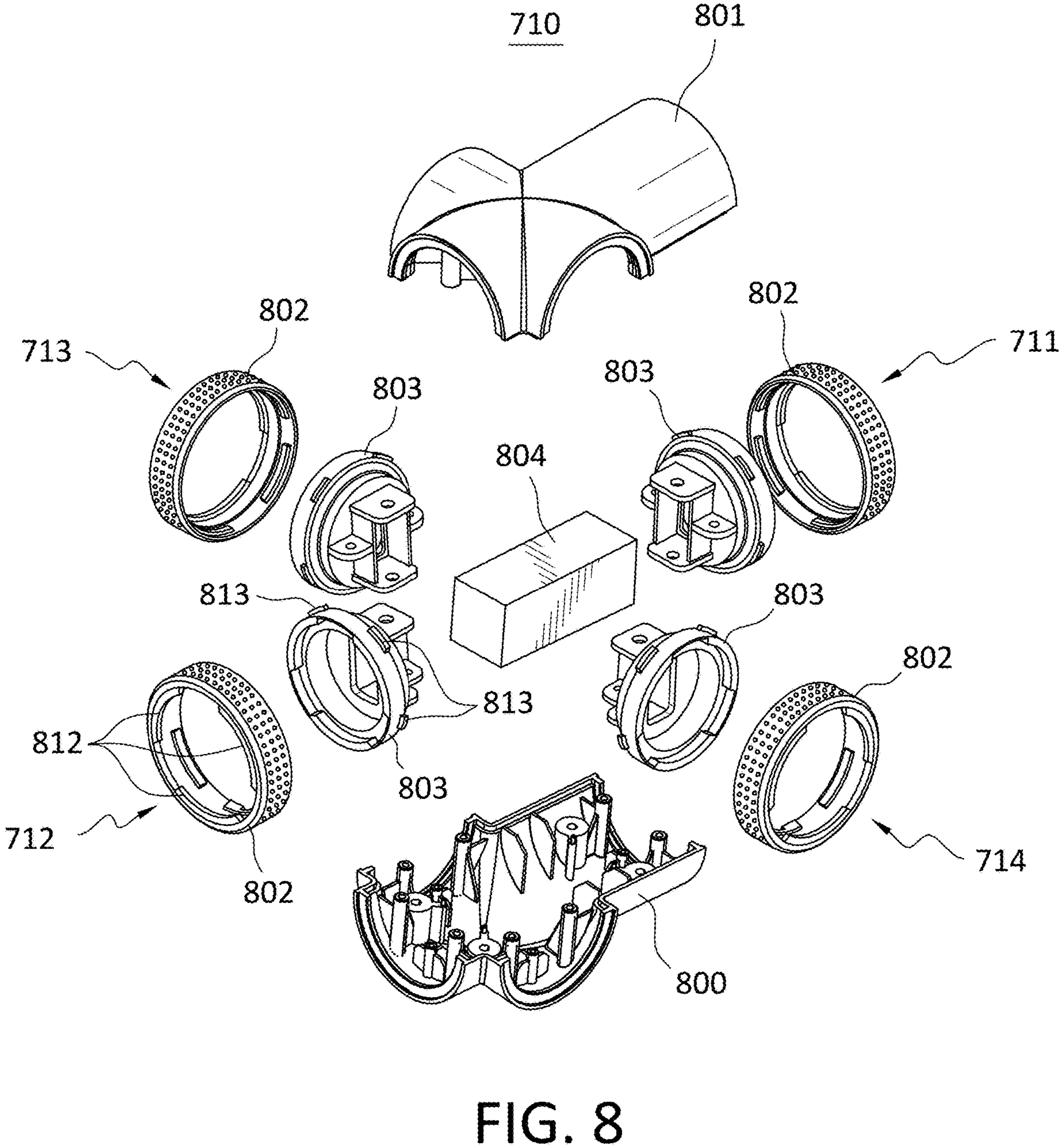
FIG. 8 illustrates an exploded view of the bridge of FIG. 7A.

Turning now to FIG. 8, an exploded view of bridge 710 is shown. In some embodiments, bridge 710 can include a bottom shell piece 800 and a top shell piece 801, and can include a rotational dial 802 and a receiving base 803 at each of locking connectors 711-714, and can include an electronics system 804. In some embodiments, each receiving base 803 can be attached to bottom shell piece 800 and/or top shell piece 801 so as to not rotate with respect to bridge 710. In some embodiments, each receiving base 803 can include one or more attachment elements 813 (e.g., tabs, threading, protrusions, recesses, etc.), which can couple with one or more attachment elements 812 on rotational dial 802.

Figure 9A:
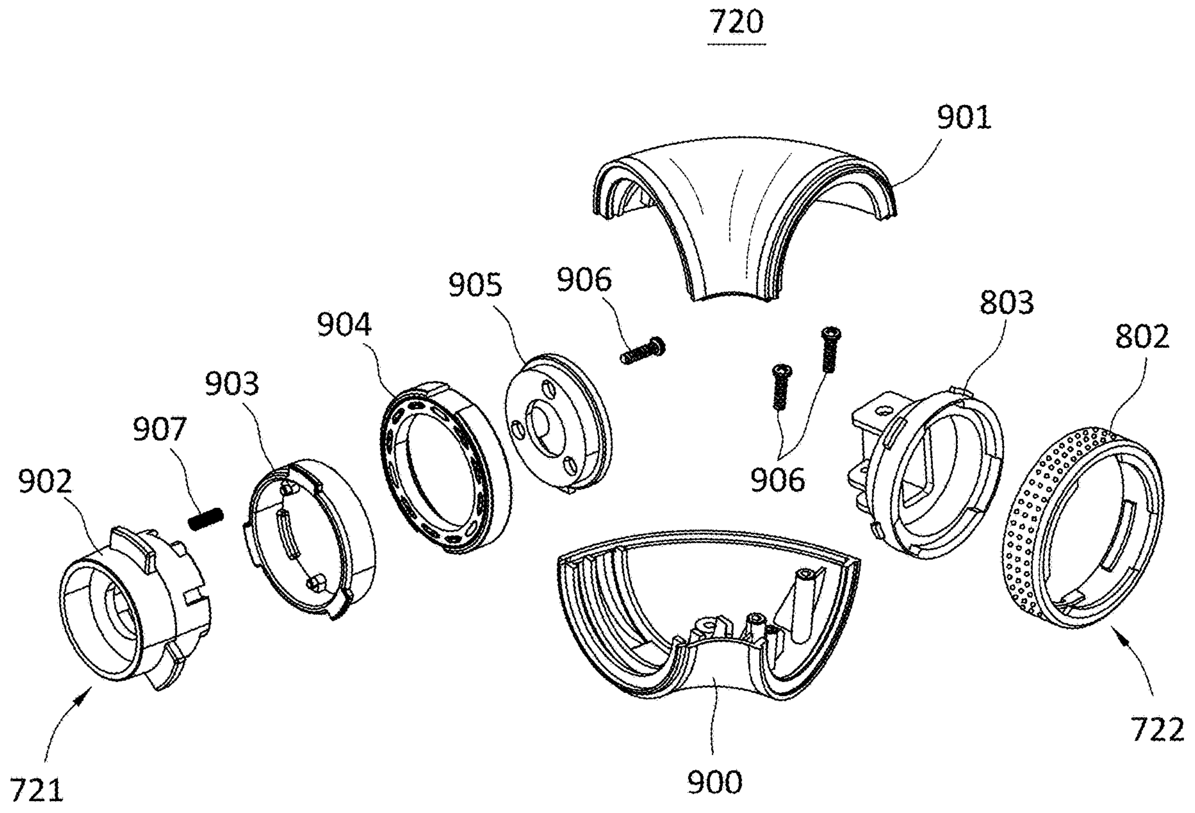
FIG. 9A illustrates an exploded view of the elbow piece of FIG. 7A.

Turning now to FIG. 9A, an exploded view of elbow piece 720 is shown. In some embodiments, elbow piece 720 can include a bottom shell piece 900 and a top shell piece 901, and can include rotational dial 802 and receiving base 803 at locking connector 722, and can include a rotation base 902, a rotation lock 903, a rotation cam 904, and a rotation mounting ring 905 at locking connector 721, screws 906 (or other suitable fasteners), and/or springs 907.

Rotational dial 802 and receiving base 803 can form a female connector type, which is shown for locking connector 722, and locking connectors 711-714 (FIGS. 7A-7E, 8). Rotation base 902, rotation lock 903, rotation cam 904, and rotation mounting ring 905 can form a male connector type, which is shown for locking connector 721 and locking connector 403 (FIGS. 4, 7A-E). The male connector type on one element (e.g., a handle element/controller) of the controller system can be coupled to the female connector type on another element (e.g., a bridge element) of the controller system and be locked in a positionally secure manner, such that the two elements are in a fixed position with respect to each other. In some embodiments, the locking connectors can couple the elements to each other while allowing the elements to rotate with respect to each other in the coupled configuration. In some embodiments, one or more of the locking connectors can be adjusted between a locked position (which does not allow rotation) and a rotatable position.

Figure 9B:
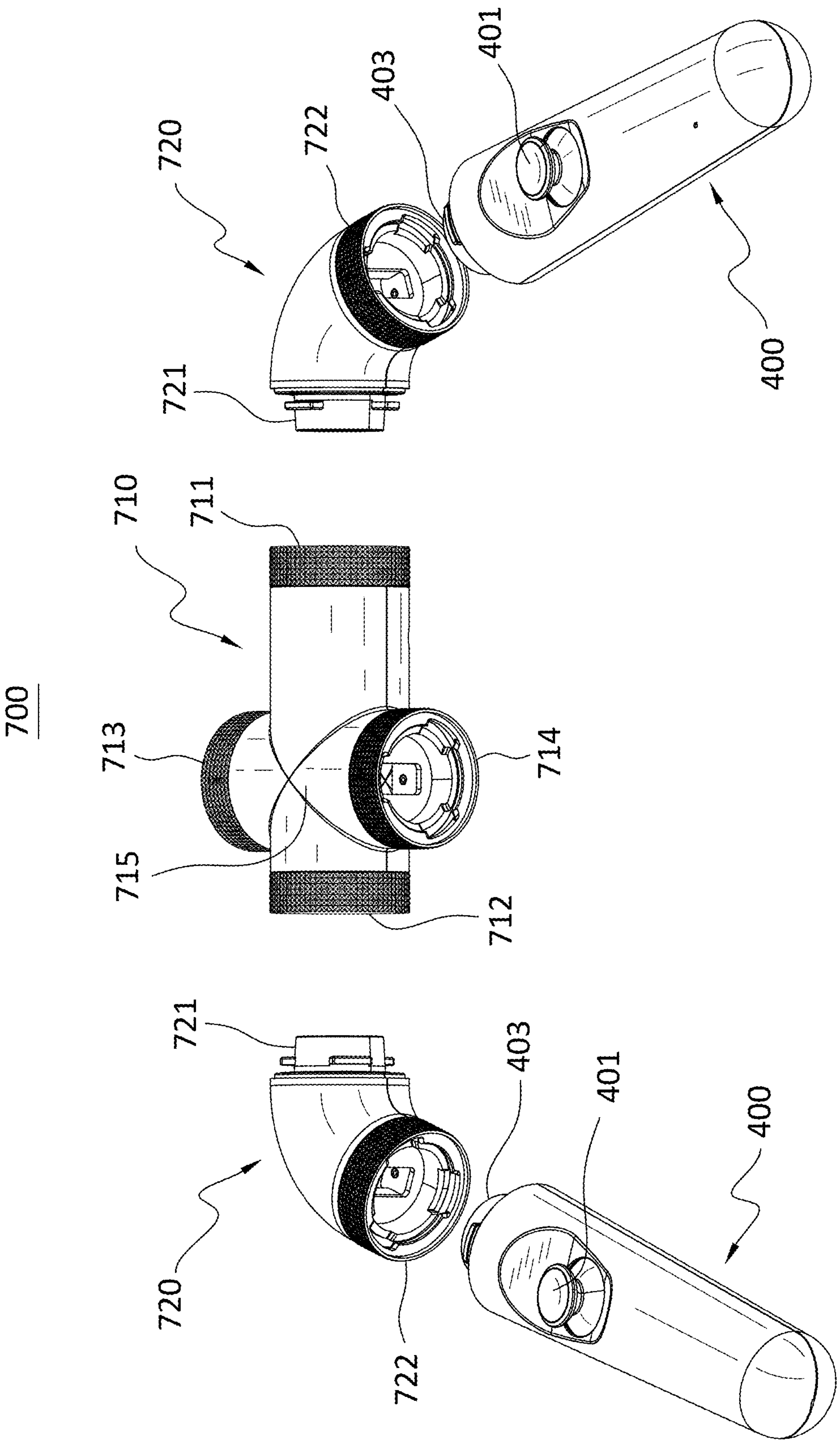
FIG. 9B illustrates elements of the controller system of FIG. 7A, including two of the controllers of FIG. 4, the bridge of FIG. 7A, and the two of elbow pieces of FIG. 7A.

FIG. 9B illustrates elements of controller system 700, including two of controllers 400, bridge 710, and two of elbow pieces 720. As shown in FIG. 9B, locking connectors 711-714 of bridge 710 and locking connectors 722 of elbow pieces 720 are the female connector type, and locking connectors 403 of controllers 400 and locking connectors 721 of elbow pieces 720 are the male connector type. Accordingly, each respective one of locking connectors 403 of controllers 400 and locking connectors 721 of elbow pieces 720 can be connected to any respective one of locking connectors 711-714 of bridge 710 and locking connectors 722 of elbow pieces 720 (on a different element), to create the configurations shown in FIGS. 7A-7E and FIGS. 9C-9D (described below), among others suitable configurations.

Figure 9D:
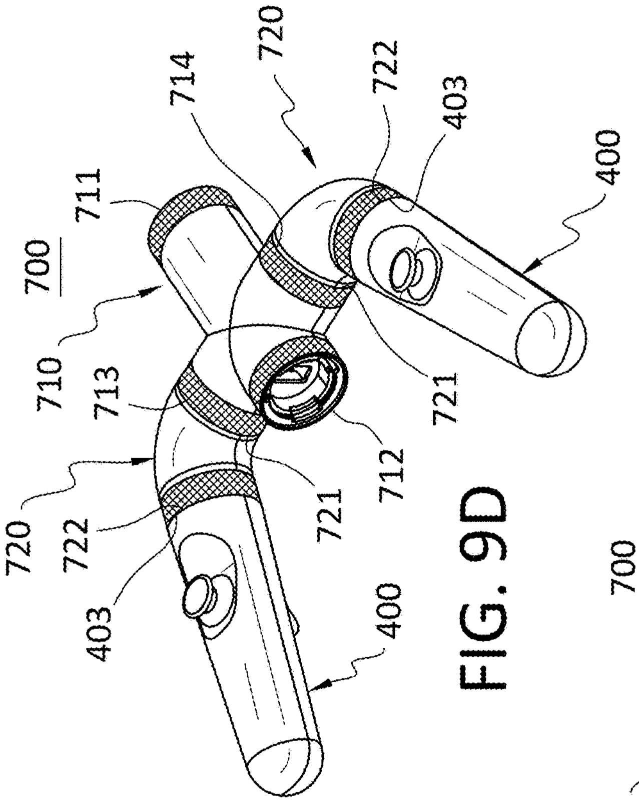
FIG. 9D illustrates the controller system of FIG. 7A in another configuration.
Figure 9E:
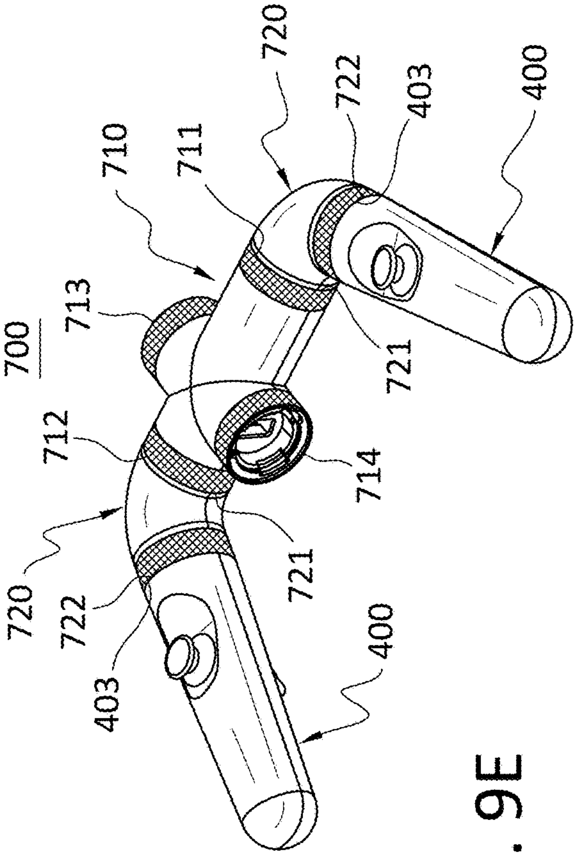
FIG. 9E illustrates the controller system of FIG. 7A in another configuration.
Figure 9C:
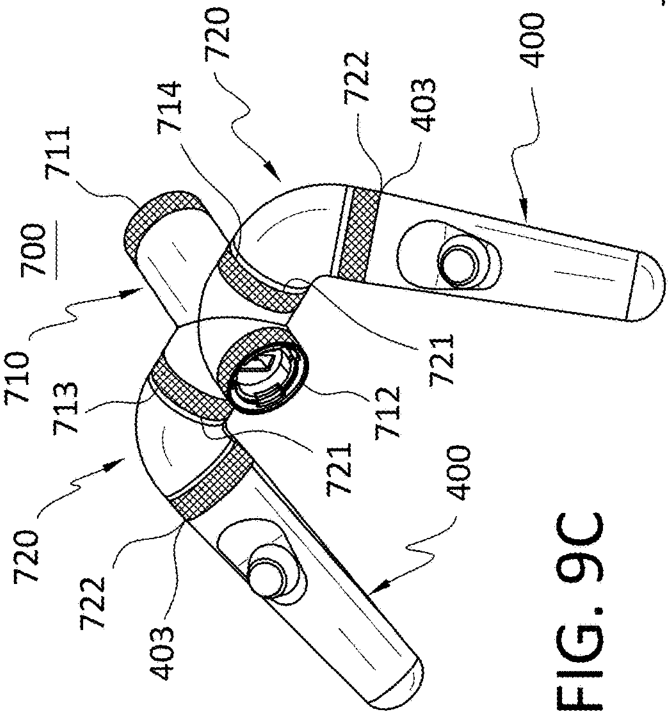
FIG. 9C illustrates the controller system of FIG. 7A in another configuration.

Turning ahead in the drawings, FIGS. 9C-9E illustrate three different configurations of controller system 700. In FIGS. 9C and 9D, controller system 700 is configured such that locking connector 403 of a first one of controller 400 is coupled at locking connector 722 of a first one of elbow piece 720, locking connector 403 of a second one of controller 400 is coupled at locking connector 722 of a second one of elbow piece 720, locking connector 721 of the first one of elbow piece 720 is coupled at locking connector 713 of bridge 710, and locking connector 721 of the second one of elbow piece 720 is coupled at locking connector 714 of bridge 710. These configurations can be similar to the configuration shown in FIG. 7A.

As shown in FIGS. 9C and 9D, the locking connectors can be locked at various different angles. Specifically, locking connectors 713 and 714 are coupled to locking connectors 721 of elbow pieces 720 at different angles in FIG. 9C than in FIG. 9D. In FIG. 9C, locking connector 711 faces around 30 degrees downward as compared to the directions faced by locking connectors 403 of controllers 400. In FIG. 9D, the direction that locking connector 711 faces is approximately co-planar to the directions faced by locking connectors 403 of controllers 400. In some embodiments, the locking connectors can be configured to be attached at multiple different angles around the circle, such as at every 180 degrees (2 points around the circle), 120 degrees (3 points around the circle), 90 degrees (4 points around the circle), 72 degrees (5 points around the circle), 60 degrees (6 points around the circle), 45 degrees (8 points around the circle), 40 degrees (9 points around the circle), 36 degrees (10 points around the circle), 30 degrees (12 points around the circle), or other suitable angles, as described further below in connection with FIGS. 9F-9O.

In FIG. 9E, controller system 700 is configured such that locking connector 403 of a first one of controller 400 is coupled at locking connector 722 of a first one of elbow piece 720, locking connector 403 of a second one of controller 400 is coupled at locking connector 722 of a second one of elbow piece 720, locking connector 721 of the first one of elbow piece 720 is coupled at locking connector 712 of bridge 710, and locking connector 721 of the second one of elbow piece 720 is coupled at locking connector 711 of bridge 710. In this configuration shown in FIG. 9E, the orientation of bridge 710 can extend the distance between controllers 400 as compared to the configurations shown in FIGS. 9C-9D.

Figure 9F:
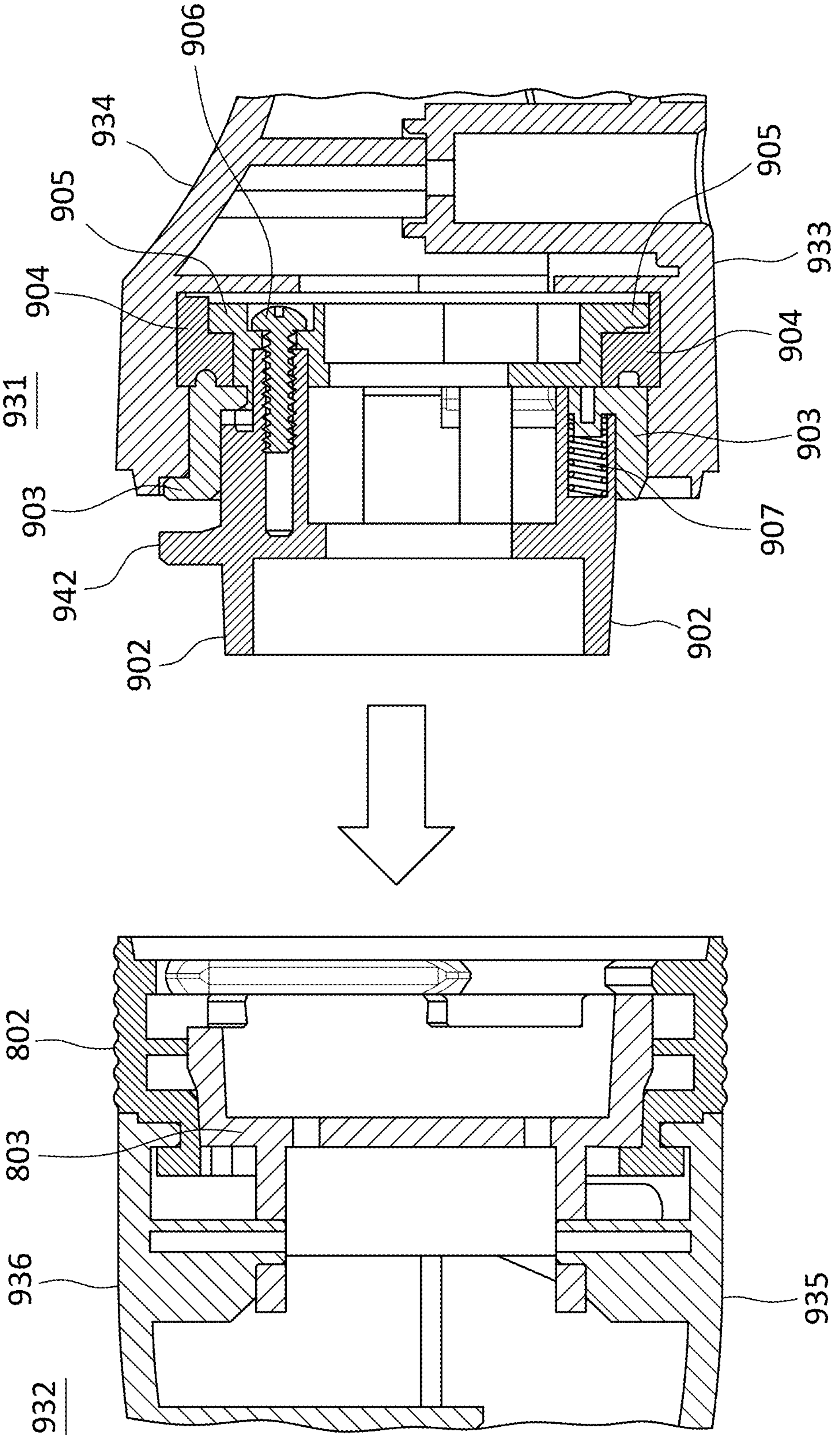
FIG. 9F illustrates a cross-sectional side view of a female connector type and a cross-sectional view of a male connector type, showing the male connector type separated from the female connector type before insertion.

Turning ahead in the drawings, FIGS. 9F-9J illustrate how a male connector type can be attached and secured to a female connector type. FIG. 9F illustrates a cross-sectional side view of a female connector type 932 and a cross-sectional view of a male connector type 931, showing the male connector type separated from the female connector type before the male connector type is inserted into the female connector type in the direction shown in the arrow on FIG. 9F. Female connector type can be similar or identical to locking connector 711-714 (FIG. 8) and/or locking connector 722 (FIG. 9A). Male connector type can be similar or identical to locking connector 403 (FIG. 4) and/or locking connector 721 (FIG. 9A). Female connector type 932 can include rotational dial 802 and receiving base 803. Receiving base 803 can be attached to bottom shell piece 935 and/or top shell piece 936. Bottom shell piece 935 can be similar or identical to bottom shell piece 800 (FIG. 8) and/or bottom shell piece 900 (FIG. 9A). Top shell piece 936 can be similar or identical to top shell pieces 801 (FIG. 8) and/or top shell piece 901 (FIG. 9A). Male connector type 931 can include rotation base 902, rotation lock 903, rotation cam 904, and rotation mounting ring 905. Rotation cam 904 can be attached to bottom shell piece 933 and/or top shell piece 934. Bottom shell piece 933 can be similar or identical to bottom shell piece 800 (FIG. 8) and/or bottom shell piece 900 (FIG. 9A). Top shell piece 934 can be similar or identical to top shell pieces 801 (FIG. 8) and/or top shell piece 901 (FIG. 9A).

Figure 9I:
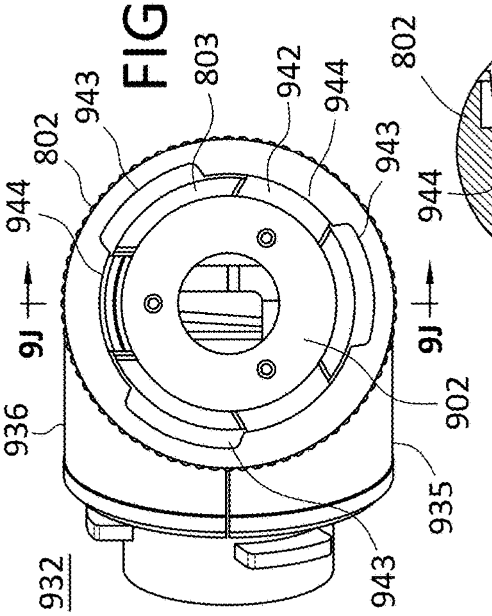
FIG. 9I illustrates an end view of the female connector type of FIG. 9F and the rotation base of FIG. 9F when the male connector type has been inserted into the female connector type and is locked.
Figure 9J:
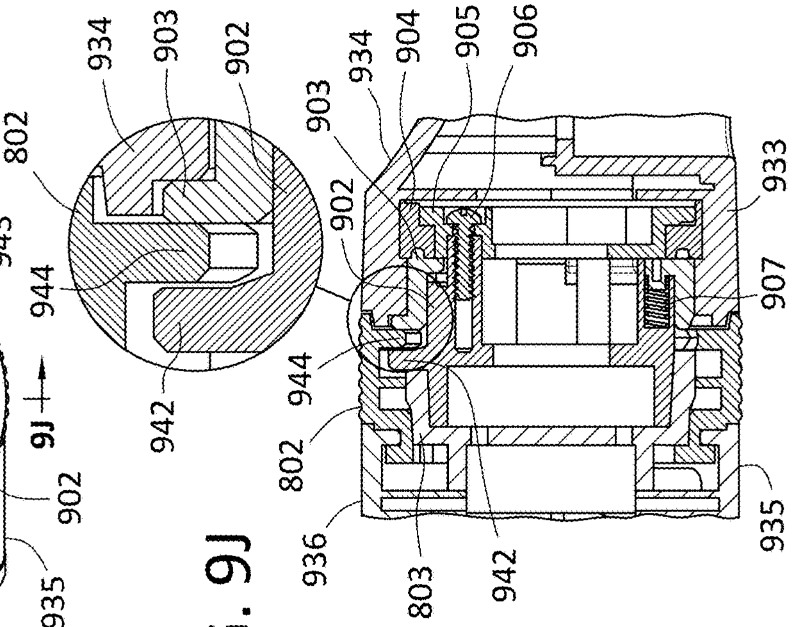
FIG. 9J illustrates a cross-sectional side view (along line 9J-9J in FIG. 91) of the female connector type and the male connector type, showing the male connector type inserted into the female connector type and locked.
Figure 9G:
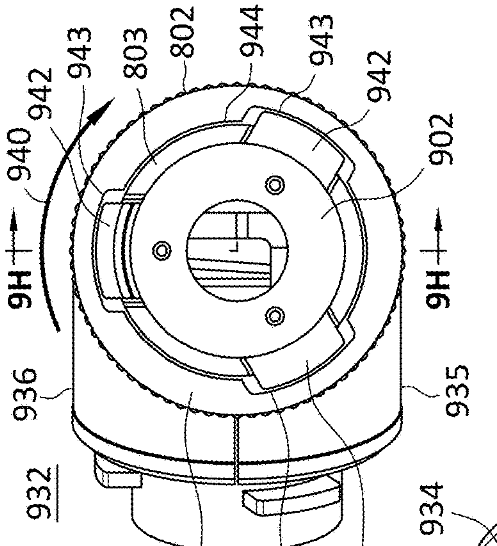
FIG. 9G illustrates an end view of the female connector type of FIG. 9F and the rotation base of the male connector type of FIG. 9F, when the male connector type has been inserted into the female connector type but not yet locked.
Figure 9H:
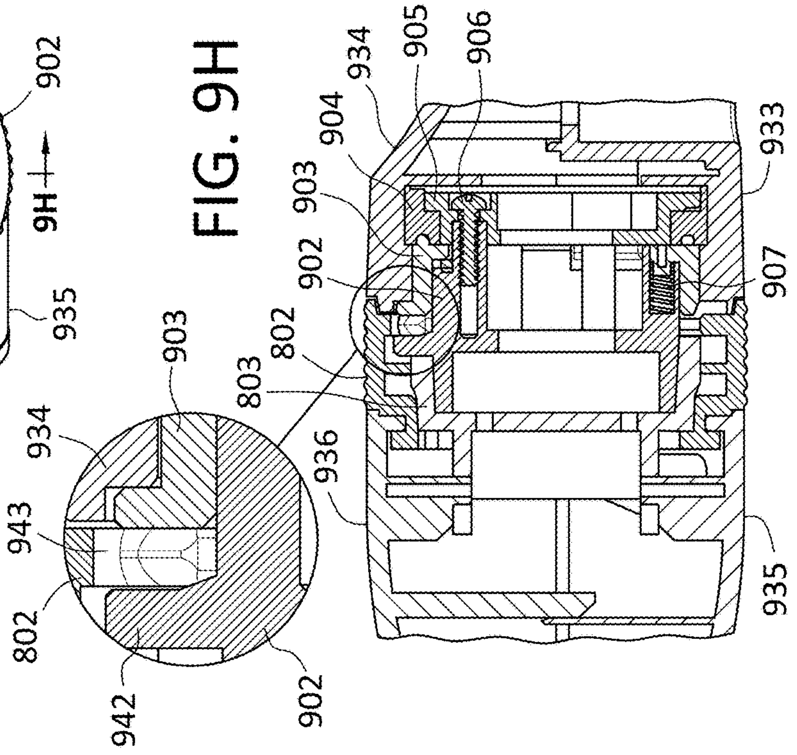
FIG. 9H illustrates a cross-sectional side view (along line 9H-9H in FIG. 9G) of the female connector type and the male connector type, showing the male connector type inserted into the female connector type but not yet locked.

FIG. 9G illustrates an end view of female connector type 932 and rotation base 902 (without showing the other portions of male connector type 931) when male connector type 931 has been inserted into female connector type 932 but not yet locked. FIG. 9H illustrates a cross-sectional side view (along line 9H-9H in FIG. 9G) of female connector type 932 and male connector type 931, showing male connector type 931 inserted into female connector type 932 but not yet locked. FIG. 9I illustrates an end view of female connector type 932 and rotation base 902 (without showing the other portions of male connector type 931) when male connector type 931 has been inserted into female connector type 932 and is locked. FIG. 9J illustrates a cross-sectional side view (along line 9J-9J in FIG. 9I) of female connector type 932 and male connector type 931, showing male connector type 931 inserted into female connector type 932 and locked.

As shown in FIGS. 9F-9H, tabs 942 of rotation base 902 can fit within slots 943 of rotational dial 802 when rotational dial 802 is unlocked. Slots 943 can be located between tabs 944 of rotational dial 802. Male connector type 931 can be inserted into female in 120 degree rotational increments, as tabs 942 are spaced every 120 degrees. In other embodiments, other rotational spacing can be used. Once inserted, rotational dial can be rotated (e.g., 45 degrees, 60 degrees, 90 degrees, or another suitable turn), such as in the direction shown by direction arrow 940, to lock male connector type 931 in a coupled configuration with female connector type 932, as shown in FIGS. 9I-9J, as tabs 944 of rotational dial 802 can prevent tabs 942 of rotation base 902 from being removed, and receiving base 803 can prevent tabs 942 from rotating.

Figures 9K, 9L, 9M, 9N, 9O:
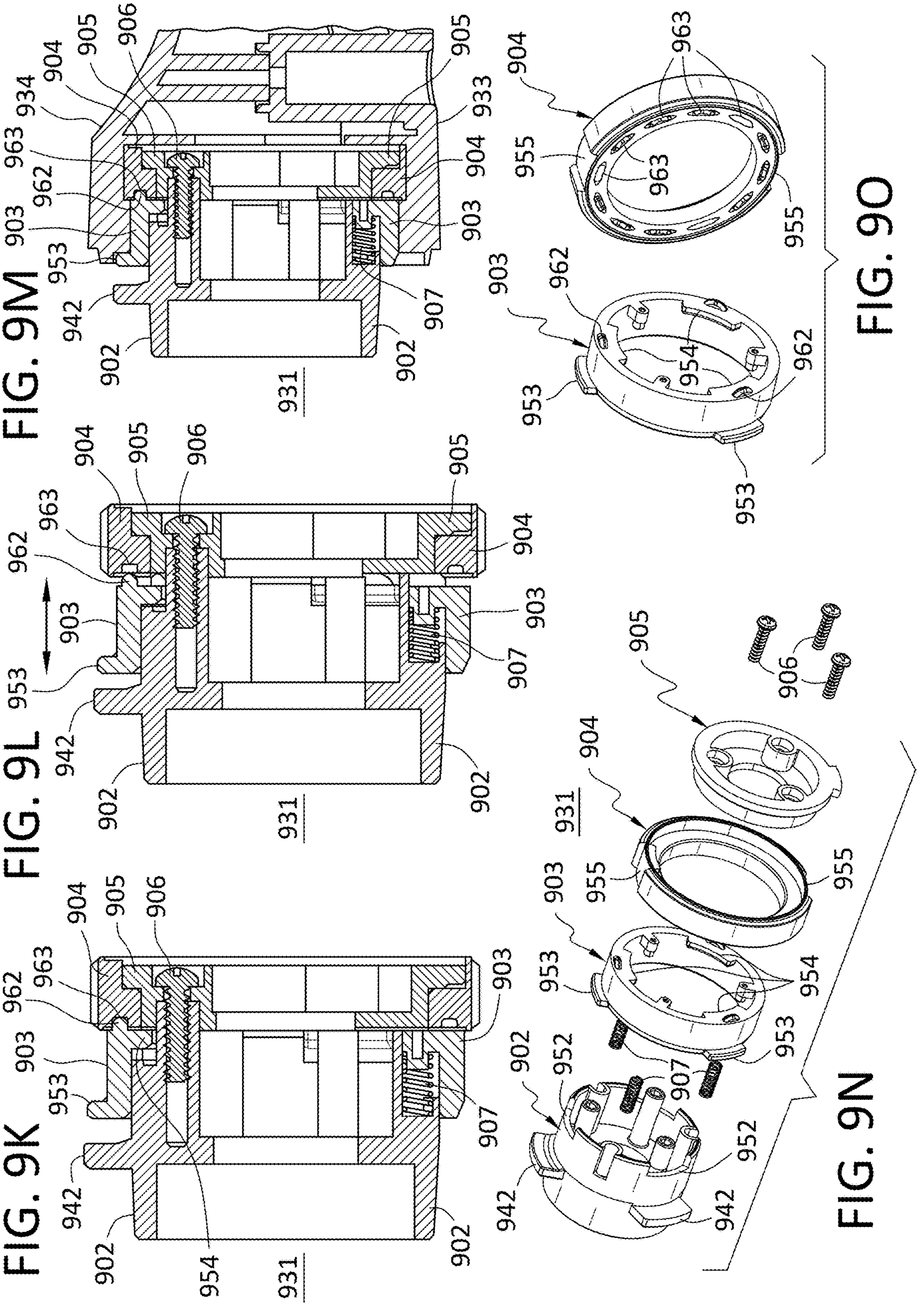
FIG. 9K is a cross-sectional view of male connector type with a rotation lock in a set position with respect to a rotation cam.
FIG. 9L is a cross-sectional view of the male connector type of FIG. 9F with the rotation lock in an unset position with respect to the rotation cam.
FIG. 9M is a cross-sectional view of the male connector type of FIG. 9F with the rotation lock in a set position with respect to the rotation cam, and showing the rotation cam secured to a top shell piece and a bottom shell piece.
FIG. 9N is an exploded view of the male connector type of FIG. 9F.

Turning ahead in the drawings, FIGS. 9K-90 illustrate how male connector type 931 can be configured to allow for granular rotational locking. FIG. 9K is a cross-sectional view of male connector type 931 with rotation lock 903 in a set position with respect to rotation cam 904. FIG. 9L is a cross-sectional view of male connector type 931 with rotation lock 903 in an unset position with respect to rotation cam 904. FIG. 9M is a cross-sectional view of male connector type 931 with rotation lock 903 in a set position with respect to rotation cam 904, and showing rotation cam 904 secured to top shell piece 934 and bottom shell piece 933. FIG. 9N is an exploded view of male connector type 931. FIG. 90 is a view of rotation lock 903 and rotation cam 904, showing tabs 962 of rotation lock 903 and detents 963 of rotation cam 904.

As shown in FIGS. 9K-9N, rotation base 902, rotation lock 903, and rotation mounting ring 905 can be rotationally fixed with respect to each other by screws 906 extending from rotation mounting ring 905 to rotation base 902, and by tabs 954 of rotation lock 903 fitting within slots 952 of rotation base 902. Rotation lock 903 can be adjustable as shown in FIGS. 9K-9M with respect to rotation base 902, but can rotation lock 903 can be spring biased by spring 907 away (from rotation base 902, toward the right in FIGS. 9K-9M). When male connector type 931 is not locked by female connector type 932 (FIGS. 9F-9J), rotation base 902, rotation lock 903, and rotation mounting ring 905 can collectively rotate with respect to rotation cam 904. Rotation mounting ring 905 can freely rotate within rotation cam 904, but rotation lock 903 can be spring biased such that tabs 962 of rotation lock 903 fit within detents 963 of rotation cam 904. Rotation cam 904 can include slots 955 by which rotation cam 904 is secured to (and not rotatable with respect to) top shell piece 934 and/or bottom shell piece 933. Rotation base 902, rotation lock 903, and rotation mounting ring 905 can be rotated by rotation lock 903 moving toward rotation base 902 (left in FIGS. 9K-9L), with tabs 962 of rotation lock 903 moving out of detents 963 of rotation cam 904, as shown in FIG. 9L, to move respective tabs 962 to the next set of respective detents 963 of rotation cam 904. Accordingly, rotation base 902, rotation lock 903, and rotation mounting ring 905 can be rotated with respect to rotation cam 904, top shell piece 934, and bottom shell piece 933 at angular intervals corresponding to detents 963. The embodiment shown in FIG. 90 has 12 detents, which allows for granular angular rotations that can be locked every 30 degrees. Other suitable numbers of detents can be used to adjust the granular rotational locking. When male connector type 931 is locked by female connector type 932, tabs 953 of rotation lock 903 can be blocked from moving toward rotation base 902 by tabs 944 of rotational dial 802, as shown in FIG. 9J.

Figure 10A:
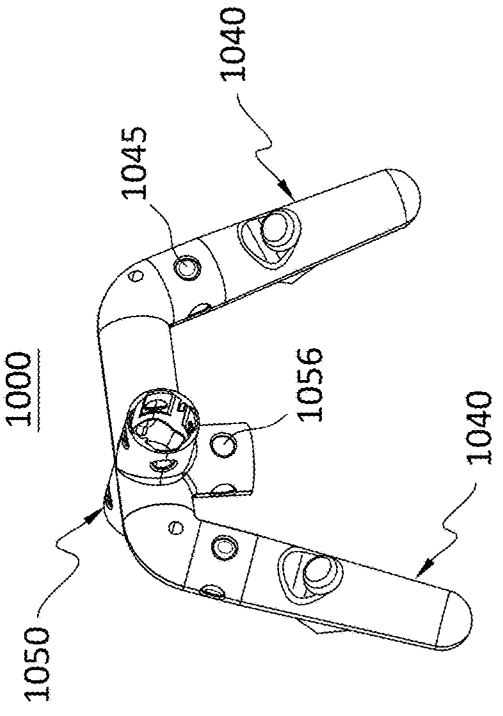
FIG. 10A illustrates a controller system in a steering configuration, according to another embodiment.
Figure 10B:
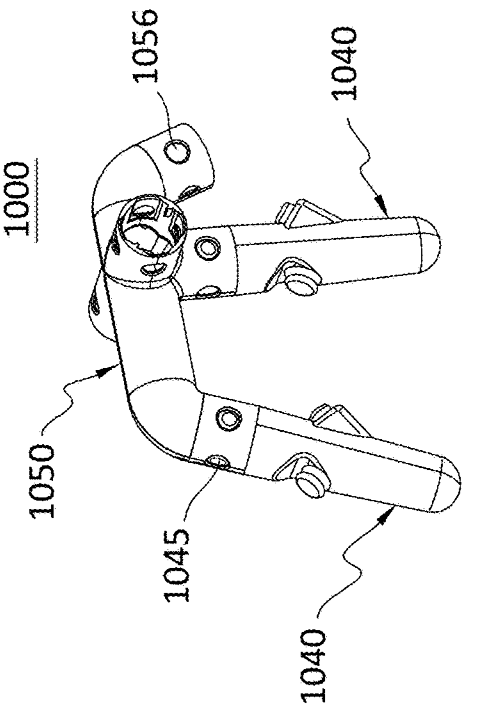
FIG. 10B illustrates the controller system of FIG. 10A in a machine gun configuration.
Figure 10C:
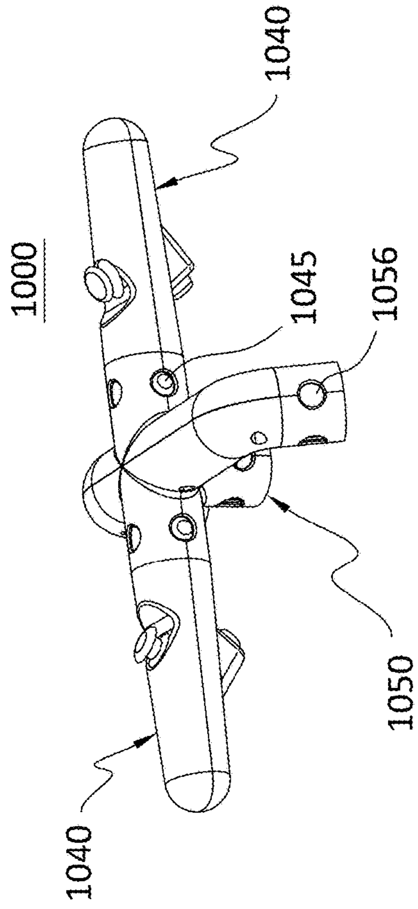
FIG. 10C illustrates the controller system of FIG. 10A in a motorcycle configuration.
Figure 10D:
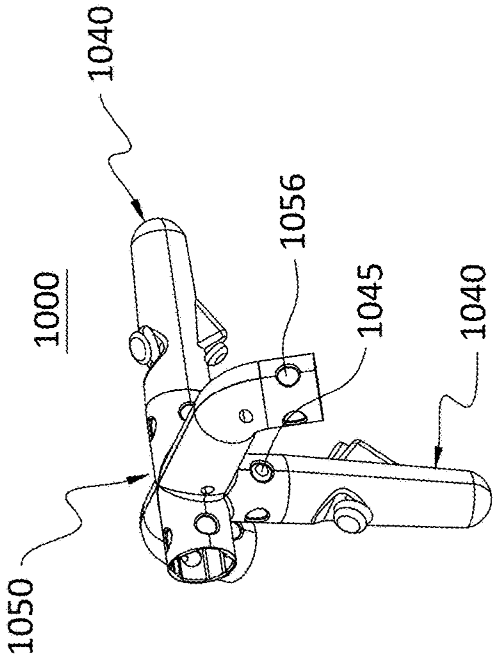
FIG. 10D illustrates the controller system of FIG. 10A in a chainsaw configuration.

Turning ahead in the drawings, FIGS. 10A-10D illustrate various configurations of an exemplary controller system 1000. FIG. 10A illustrates a steering configuration of controller system 1000. FIG. 10B illustrates a machine gun configuration of controller system 1000. FIG. 10C illustrates a motorcycle configuration of controller system 1000. FIG. 10D illustrates a chainsaw configuration of controller system 1000. Controller system 1000 is not limited to the embodiments described herein, and a person having ordinary skill in the art will understand that one or more elements of controller system 1000 can be modified, altered, or substituted with other elements described in this disclosure. In many embodiments, controller system 1000 can be similar to controller system 600 (FIG. 6), but use a different locking mechanisms in its locking connectors. For example, controller system 1000 can include two handle controllers 1040, which can be similar to controller 400 (FIG. 4), and a bridge 1050, which can be similar to bridge 500 (FIG. 5). Various elements of handle controllers 1040 can be similar or identical to various elements of controller 400 (FIG. 4), and various elements of bridge 1050 can be similar or identical to various elements of bridge 500 (FIG. 5). In these or other embodiments, a locking connector in controller system 1000 can use a plastic and/or metal tab 1045, such as part of handle controllers 1040, which can be configured to couple via tab receiving opening 1056, such as part of bridge 1050. In other embodiments, the tabs (e.g., 1045) can be used on the bridge (e.g., 1050), and the tab receiving openings (e.g., 1056) can be used on the handle controllers (e.g., e.g., 1040). In some embodiments, the bridges (e.g., 710 (FIG. 7)) and/or elbow pieces (e.g., 720 (FIG. 7)) can include similar or identical tabs and/or tab receiving openings instead of the locking connectors shown in FIG. 7.

Figure 11:
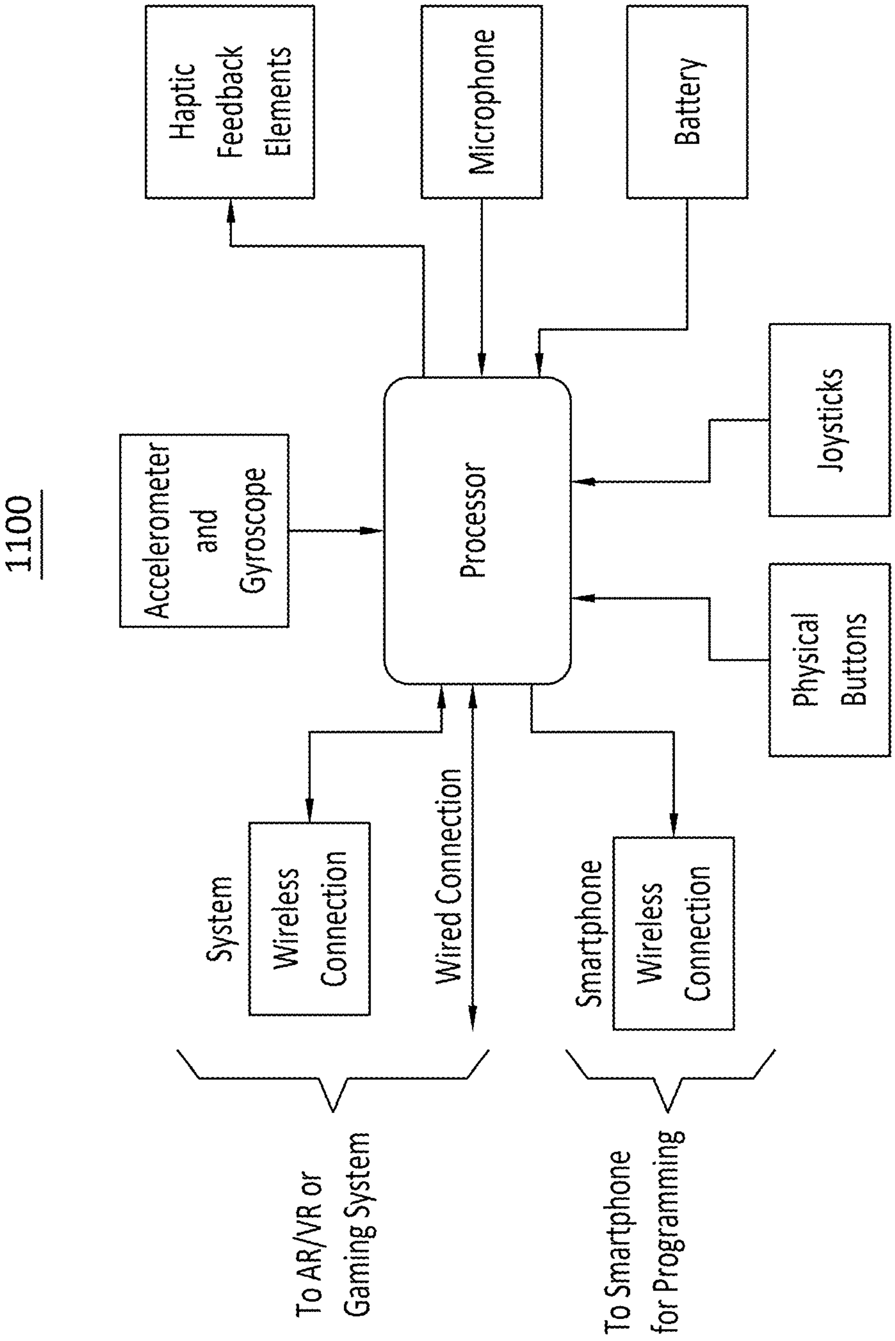
FIG. 11 illustrates a circuit diagram with a single processor topology, according to an embodiment.

Turning now to FIG. 11, an exemplary circuit diagram 1100 is shown with a single processor topology. In many embodiments, circuit diagram 1100 can be referred to as a single processor topology and/or single processor embodiment. In many embodiments, in a single processor topology, the electronic components can reside in a bridge, except for various inputs (e.g., a two dimensional input 401 (FIG. 4) and/or a one dimensional input 402 (FIG. 4)) contained in one or more handle controllers. In other embodiments, the opposite can be true (e.g., a single processor topology can involve the electronic components residing in a handle controllers, except for various inputs which can be contained in a different one of the handle controllers or in the bridge). In still further embodiments, a bridge can have no circuit topology and be empty or merely a conduit between handle controllers. In various embodiments, connections between controllers, or a user-defined configuration, can inform a processor which physical arrangement of controllers (e.g., FIGS. 6A-6D, 7A-7E, 9C-9E, 10A-10D a user has chosen. In these embodiments, a processor can then map the signals from inputs (e.g., buttons, joysticks, accelerometers, gyroscopes, etc.) to a default set of command outputs. In some embodiments, a default mapping can be overridden by a preset for a given experience or if the user desires a different mapping configuration. In some embodiments, a single processor topology can have multiple data connection points and communication topologies for data exchange with various computer systems. For example, a connection to the AR/VR/game system can be either wired and/or wireless. As another example, s second wireless topology can allow a controller to connect with a portable electronic device (e.g., a smartphone, tablet or other computing device), such as to allow the user configure user-define configurations for the inputs/buttons. A number of default button mappings can exist. For example, joysticks can modulate both a viewing perspective and movement through a video game environment. As another example, one joystick can control movement in 3D space and a gyroscope can affect a viewing perspective. As a third example, a gyroscope can control user movement in 3D space and can also affects a viewing perspective. This example could then lead to a user to walking around in a real world environment, providing X, Y and Z offsets to a virtual environment.

Figure 12:
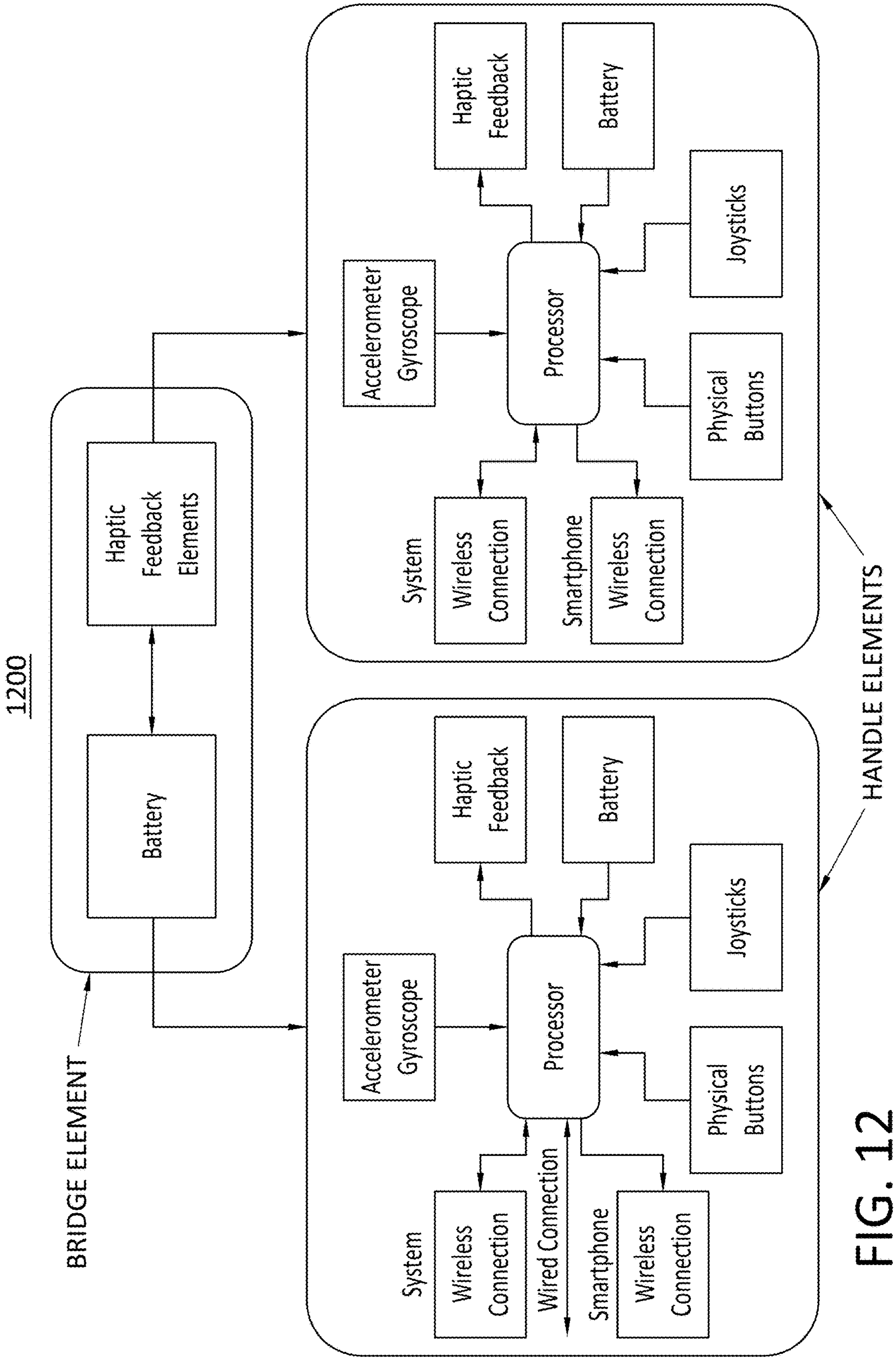
FIG. 12 illustrates a circuit diagram with a two processor topology, according to another embodiment.

Turning now to FIG. 12, an exemplary circuit diagram 1200 is shown with a two processor topology. In many embodiments, circuit diagram 1200 can be referred to as a two processor topology and/or two processor embodiment. In a two processor embodiment, each handle controller can have a processor, haptic driver (or drivers), one or more wireless radios, accelerometers, gyroscopes, and/or batteries in each handle controller. In many embodiments, a bridge can contain one or more additional batteries and/or haptic drivers. In many embodiments, one or more handle controller can be chosen to communicate with an AR/VR/Game system or other computer systems, while another other handle controller can communicate through first handle controller. In these embodiments, handle controllers not communicating with external gaming and/or computer systems can power down their wireless communication hardware to preserve battery for use by more energy intensive controllers. In other embodiments, each of the handle controllers can communicate with the game system. Much like with a single processor embodiment, a processor can then map the signals from inputs (e.g., buttons, joysticks, accelerometers, gyroscopes, etc.) to a default set of command outputs based on the presence and/or configuration of various controller elements. In some embodiments, a default mapping can be overridden by a preset for a given experience or if the user desires a different mapping configuration.

Figure 13:
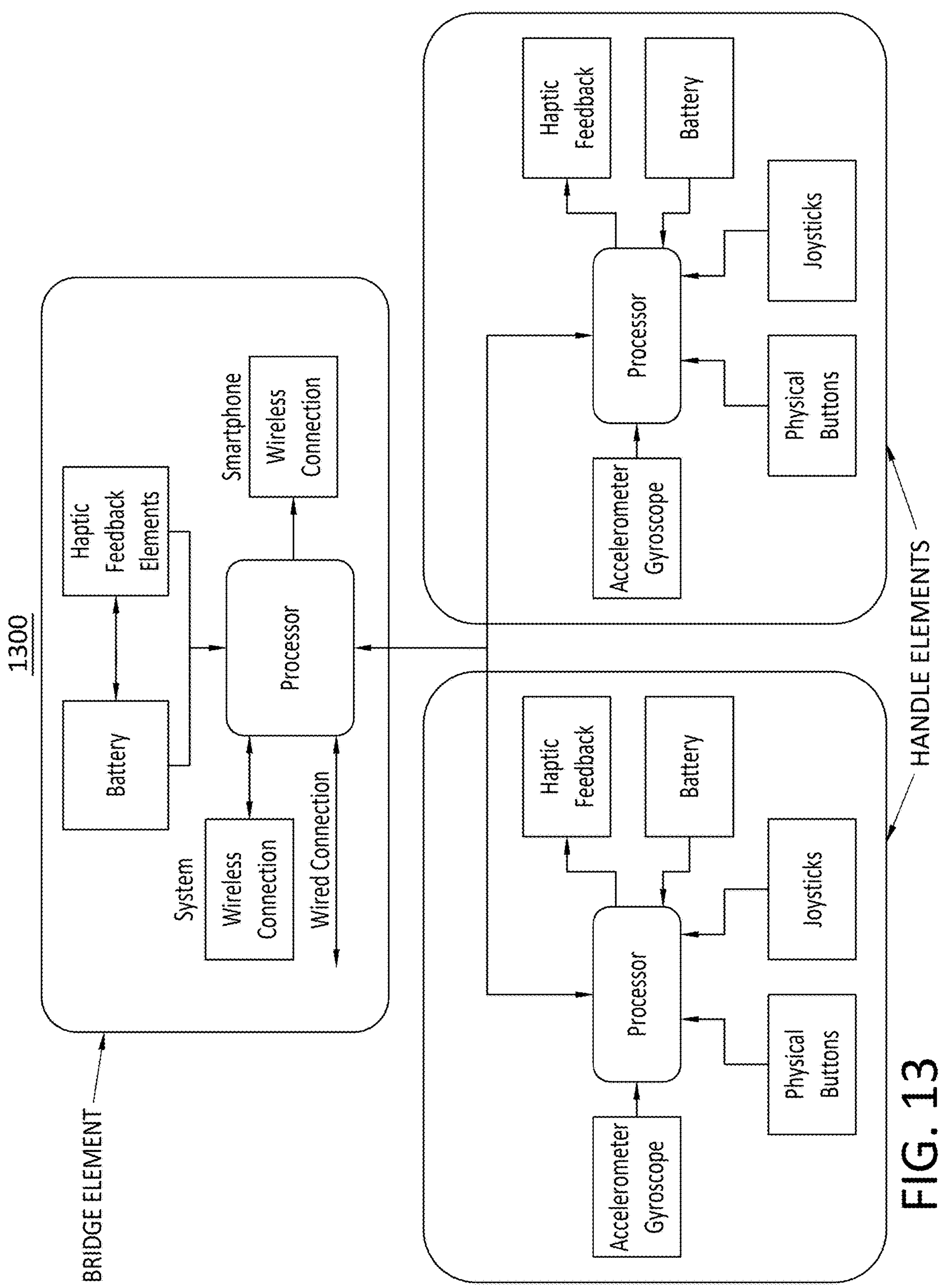
FIG. 13 illustrates a circuit diagram with a three processor topology, according to another embodiment.

Turning now to FIG. 13, an exemplary circuit diagram 1300 is shown with a three processor topology. In many embodiments, circuit diagram 1300 can be referred to as a three processor topology and/or three processor embodiment. In a three processor embodiment, each handle controller can also have a processor, one or more haptic driver, one or more accelerometers, one or more gyroscopes and/or one or more batteries. In these or other embodiments, one or more handle controllers can communicate with a bridge, which then can pass commands to an AR/VR/game system. In various embodiments, communication between handle and bridge can be done through a physical wire and/or through short range communication methods (e.g., Bluetooth LE). In many embodiments, connections between different controller elements inform a processor which physical arrangement a user has chosen for a given controller system. In some embodiments, a bridge processor can map signals from various controller inputs to a default set of command outputs. In these embodiments, this mapping can be overridden by a preset for a given experience or if the user desires a different mapping configuration.

In many embodiments, one or more controllers described herein can comprise one or more rechargeable batteries and/or other electrical storage devices (e.g., a super-capacitor). In some embodiments, an electrical storage device can be internal and/or external to a controller. In some embodiments, a controller (and/or controller systems) can be also function in a wired configuration. In many embodiments, as various elements are connected as a controller system, charge can flow from a highest-charged element to a lowest-charged element. In this way, electrical charge is distributed evenly across the element to provide optimal charge levels to element with the highest current consumption. In some embodiments, having batteries in each element can allow each element to be used individually. An example of this is when the user desires to use a handle controller in each hand to make independent movements simulating the use of two swords. In many embodiments, one or more controllers described herein can comprise one or more data transfer ports (e.g., USB, PCI, Thunderbolt, etc.) for connection with other electronic devices and for recharging.

In some embodiments, one or more controllers described herein can be configured to receive one or more external chips and/or cards. For example, a controller can be configured to receive a USB thumb drive, a SD card, and/or some other type of external non-volatile memory (e.g., an external card). In some embodiments, an external card can be for external and/or expanded storage (e.g., game file storage), security, additional RAM, external processors, etc. In many embodiments, an external card can be used to implement a digital rights management (DRM) system.

In some embodiments, an external card can use a numeric "key" which a controller can pass to a connected VR/AR or game system, thereby authenticating access to a game and/or gaming system. In this way, a controller can be used with a variety of proprietary AR/VR and/or game systems by simply swapping out each system's external card. In some embodiments, a controller can be purchased with one or more external cards, or they can be purchased as needed, including when new AR/VR and game platforms are introduced.

In many embodiments, one or more controllers can interface and/or communicate with non-gaming software applications installed on an external electronic device. In some embodiments, a non-gaming software application (e.g., on a user's mobile device, such as a smartphone) can allow a user to choose how various inputs (e.g., switches, potentiometers, accelerometer, gyroscopes) are mapped to commands sent to a connected system. In other embodiments, this mapping can be performed by a connected videogame system. In some embodiments, a non-gaming software application can store and/or load user specified presets for a specific gaming system and/or gaming software. In further embodiments, a non-gaming software application can facilitate scaling and/or calibration for display size, physical motion limitations, adding voice commands, and/or haptic settings. In various embodiments, a non-gaming software application can communicate with a controller on a separate wireless link independent from an AR/VR/Gaming system. This enables a controller to work on a wide range of AR/VR/Gaming systems and also alter games settings without using the controller as the input.

In some embodiments, in addition to, or alternative to, sending position and control information to the VR/Gaming system, the controllers can send this information to each other, to provide multi-user inter-controller communications. This information can be used to prevent the users from making physical contact with each other as well as having application in the VR/gaming experience. An example of how this information communication can be used is by providing the ability for two or more users to work together and have more power in the experience than they would have individually.

Sharing position information between controllers also can be used to improve the positional accuracy of each controller by using additional sensors (gyroscopes/accelerometers) in the neighboring controllers. These shared, inter-controller communications can also drive local (on controller) responses such as increasing haptic intensity as another user's controller approaches. In some embodiments, these features can be provided without support from the VR/gaming system.

In many embodiments, one or more controllers described herein can comprise one or more microphones. In these embodiments, in-game communication and/or voice commands can be used. In various embodiments, voice commands can be used to alter one or more configuration options described above with reference to non-gaming software. In some embodiments, voice commands can also be used to initiate one or more in game actions (e.g., shoot, move, pause, menu, etc.). In many embodiments, a controller can monitor an audio stream looking for trigger phrases that match commands that have been stored by a user. These trigger phrases can be preloaded during the manufacturing process and/or can be recorded and stored by a user. In this way, the user can use customized commands in their own voice and/or language. In further embodiments, processing for voice commands can performed on a controller using keyword detection algorithms. This can provide lower latency from when a trigger phrase is detected, and a desired command executed. Alternatively, or in combination, a cloud service can be used to expand the range of voice commands. In some embodiments, voice commands can be set to apply to all games or just apply to specific games.

Figure 14:
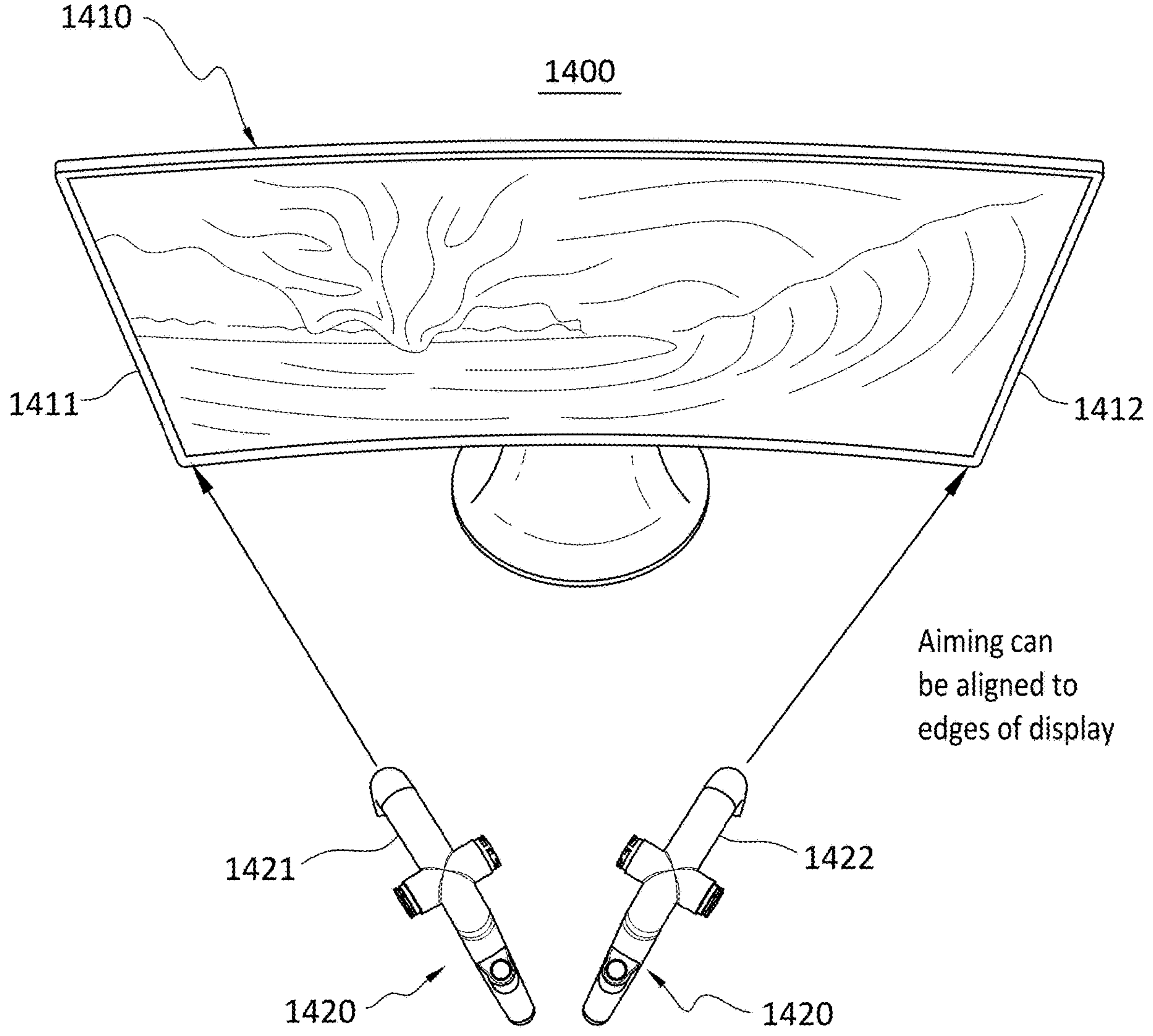
FIG. 14 illustrates a system for performing a calibration process, according to another embodiment.

Turning now to FIG. 14, a system 1400 is shown for performing a calibration process. As shown in FIG. 14, system 1400 can include a controller system 1420 (which can be similar or identical controller systems 600 (FIG. 6), 700 (FIG. 7)), and a display 1410, such as conventional (e.g., 2D) displays. In these embodiments, a user has the ability to scale their motions to match the size of a 2D display by calibrating a controller for the 2D display. When this calibration is desired, a user can point controller system 1420 in a direction 1421 toward one edge 1411 (e.g., a left edge) of display 1410 and set that coordinate (e.g., by actuating one or more controller inputs). Subsequently, the user can point the controller system 1420 in a direction 1422 toward an opposite edge 1412 of display 1410 and sets that coordinate. In this way, a more realistic interaction can be achieved because physical motions of the controller can match what a user is seeing on the 2D display. Calibration process can also account for a user's distance from a 2D display.

Figure 15:
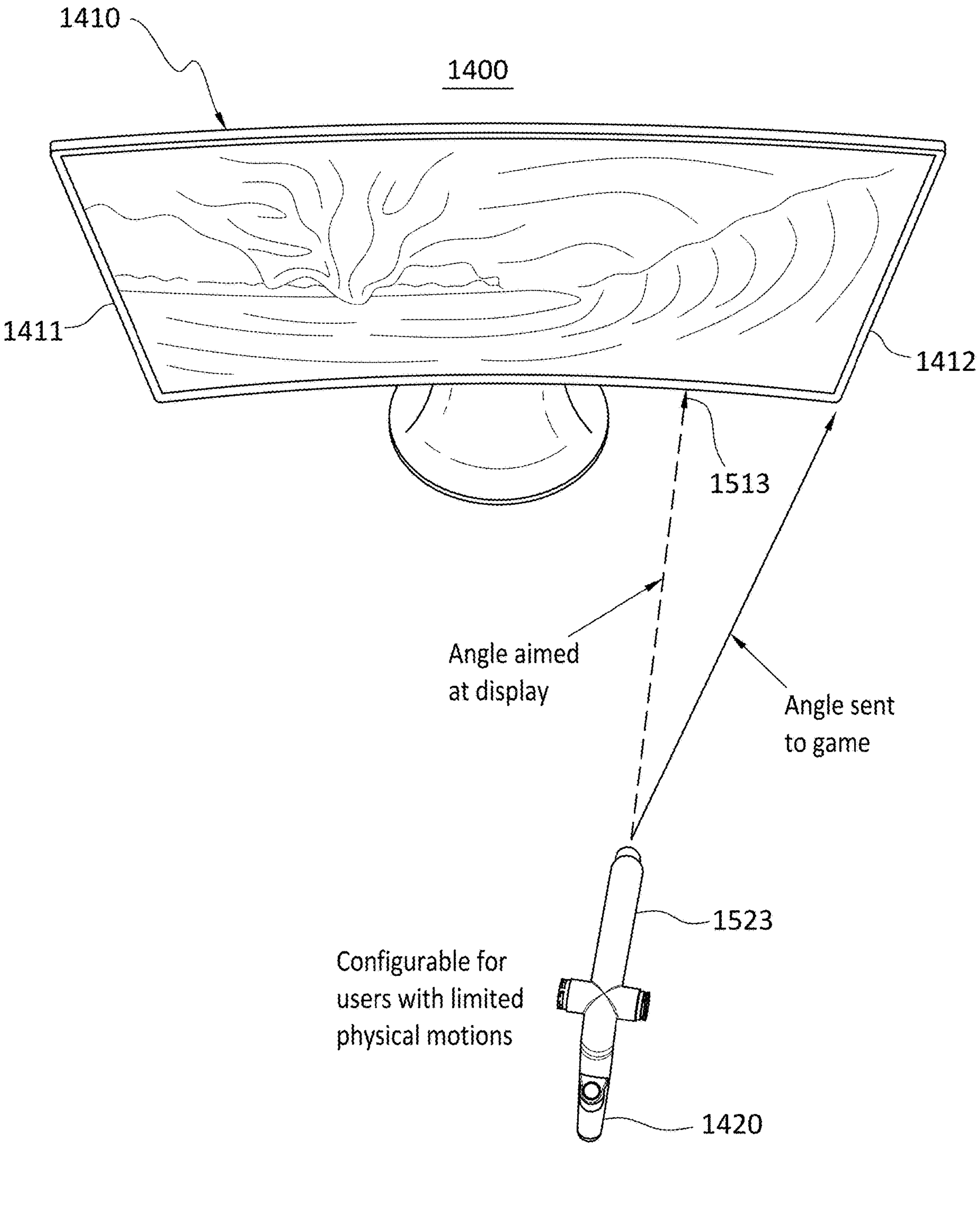
FIG. 15 illustrates the system of FIG. 14 for performing a calibration process for a reduced range of motion.

Turning now to FIG. 15, system 1400 is shown for performing a calibration process for a reduced range of motion. In some embodiments, the calibration process can be used for users with disabilities and/or other impairments to range of motion or movement. For example, if the user has a limited range of motion and/or prefers to cover the entire left-right distance of display 1410 without pointing at the edges 1411 and 1412, the user can aim the controller system 1420 in a direction 1523 toward a portion of the screen inside the edge (1411 or 1412). As shown in FIG. 15, when calibrating for edge 1412, the user can aim controller system 1420 toward a point 1513 inside the screen (e.g., leftward) from edge 1412. Similarly, at the left edge, the user can aim controller system 1420 toward a point (not shown) rightward from edge 1411. These different calibration points (e.g., 1513 instead of 1412) can adjust the scaling used when the user operates controller system 1420. For example, when the user aims at point 1513 during play, controller system 1420 and/or the game system can scale the motion such that it is treated as if the user was pointing at edge 1412 instead of point 1513.

In some embodiments, an alternate control signal for a user with limited finger mobility (e.g., who cannot operate a joystick effectively) can be implemented by employing an output from a gyroscope as a joystick input. In many embodiments, a single dimension of motion can be calibrated. For example, using a handlebar configuration, if a user has limited movement in the yaw dimension, a yaw signal could be amplified so that less physical travel was necessary to achieve a full range of motion in a game.

Figure 16A:
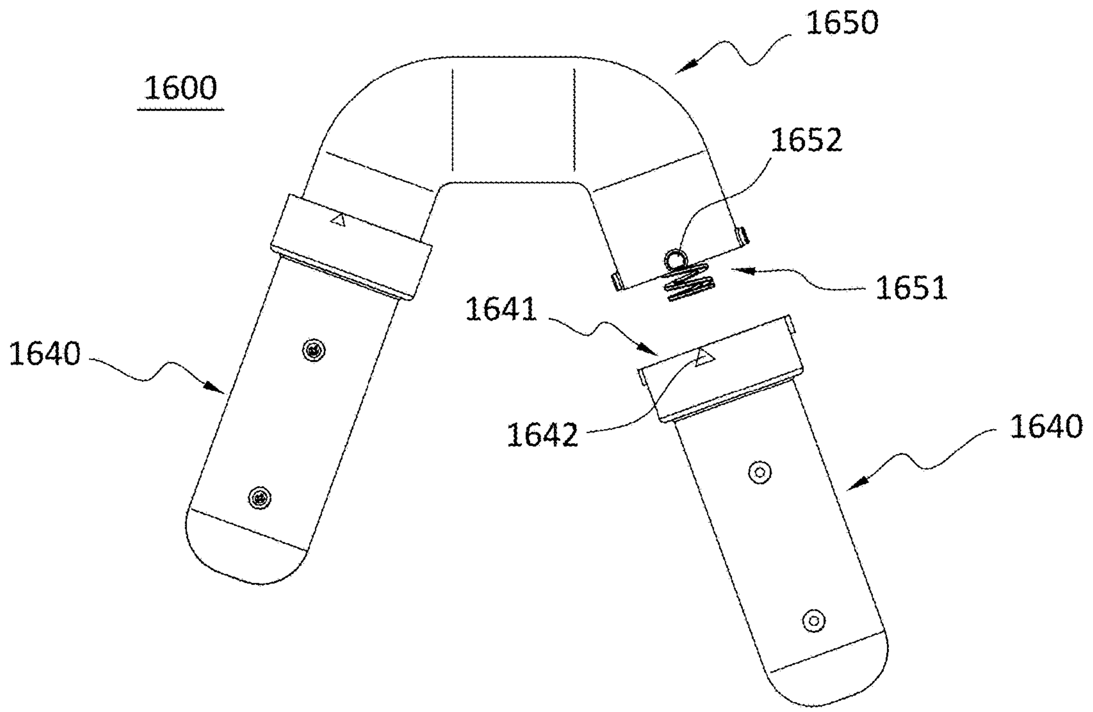
FIG. 16A illustrates a controller system, according to another embodiment.

Turning ahead in the drawings, FIG. 16A illustrates a controller system 1600, according to another embodiment. Controller system 1600 can include two controllers 1640 and a bridge 1650, which can be similar to the controller elements and bridge elements described above, but can provide a rapid attach/detach mechanism to allow handle controllers 1640 to be readily attached and/or detached from bridge 1650. In many AR/VR/gaming experiences there are times when the user's hands move independently from each other. In other words, situations arise where both hands would not be continuously "fixed" together by holding a single controller. To enable this flexibility, controller system 1600 can operate with the controllers 1640 connected or disconnected. Due to the immersive nature of AR/gaming experiences, it is beneficial for each hand element to easily attach and detach from each other without the user physically seeing the game controller elements. Some systems allow a 3D model of the controller to be input so that a virtual representation of the controller can rendered by the experience's computer graphics. While this visualization will assist the user in the attach/detach process, on a physical level, it is advantageous for the attach/detach process to be as fluid as possible, so that this process does not interfere with the user's activity in the AR/gaming experience.

The attach/detach coupling can beneficially connect the two hand elements (e.g., controllers 1640) rigidly enough to the bridge element (e.g., bridge 1650) so that these don't detach inadvertently, while still allowing detachment when it is desired by the user. A mechanical coupling can be used with or without magnets to assist with alignment and orientation. Having a unique motion to separate the hand elements can be advantageous, and one option for this movement action is through twisting the two hand elements in different directions to achieve the separation. For example, a left hand controller can be twisted counterclockwise to detach, while a right hand controller can be twisted clockwise to detach.

In some embodiments, magnets can be included in the attach/detach coupling mechanism to assist with attachment and/or orientation. Through North/South orientation of an array of magnet pairs, specific controller orientations are possible without the user looking directly at the controller. The twist to detach process is also possible through arrangement of the magnetic orientations.

Embedded in the attach/detach coupling are electrical contacts that can reestablish electrical connections between the two hand elements. The contact surfaces can be arranged in circular patterns to allow various angles of attachment.

For example, as shown in FIG. 16A, connector 1641 of controller 1640 can be readily attached and/or detached from connector 1651 of bridge 1650. In a number of embodiments, connector 1641 can include an indicator 1642 (e.g., an arrow, which can be raised), which can be matched to an indicator 1652 (e.g., a dot, which can be raised) to insert connector 1641 into connector 1651. Controller 1640 can be pushed toward bridge 1650 and turned until connector 1641 is snapped into connector 1651. To detach controller 1640 from bridge 1650, the reverse process can be followed.

Figure 16B:
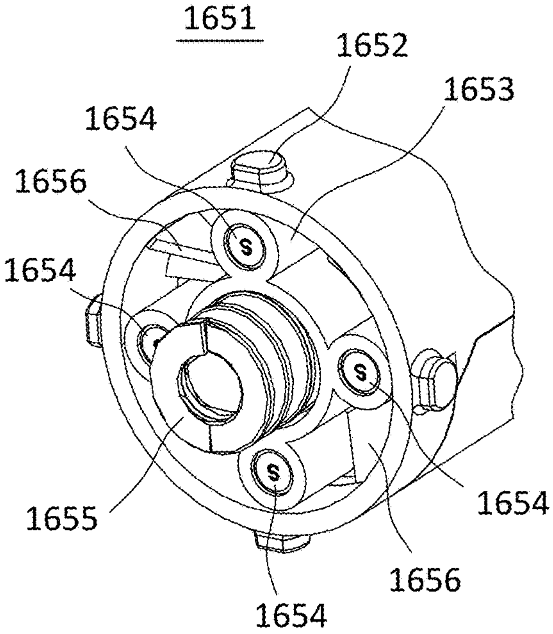
FIG. 16B illustrates a perspective view of the connector of the bridge of FIG. 16A.
Figure 16C:
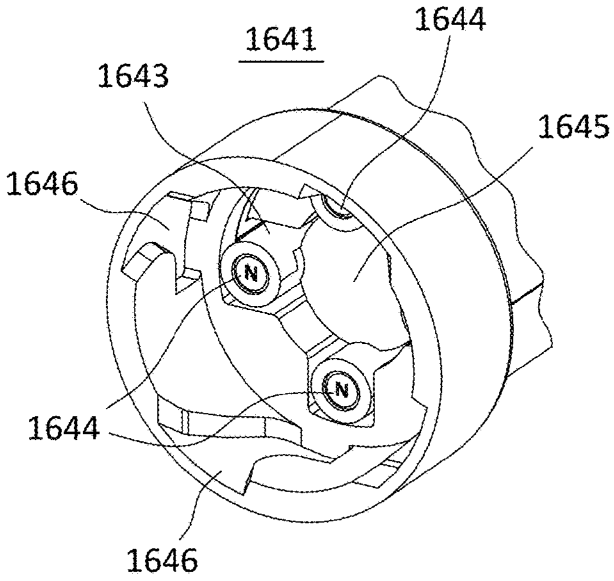
FIG. 16C illustrates a perspective view of the connector of one of the controllers of FIG. 16A.

FIG. 16B illustrates a perspective view of connector 1651. FIG. 16C illustrates a perspective view of connector 1641. Connector 1651 can include a magnet housing 1653, magnets 1654, a compression spring 1655, and/or catches 1656. Connector 1641 can include a magnet housing 1643, magnets 1644, a surface 1645, and slots 1646. Magnets 1654 and magnets 1644 can be opposite polarity to attract each other. Compression spring 1655 can push against surface 1645 as the magnets attract controller 1640 to bridge 1650 to slow the attachment and prevent overly rapid attachment as connectors 1641 and 1651 are snapped together. Catches 1656 can be secured within slots 1646, which can include detents to secure catches 1656 within slots 1646 when connector 1641 of controller 1640 is rotated (e.g., twisted) with respect to connector 1651 of bridge 1650.

Figure 17:
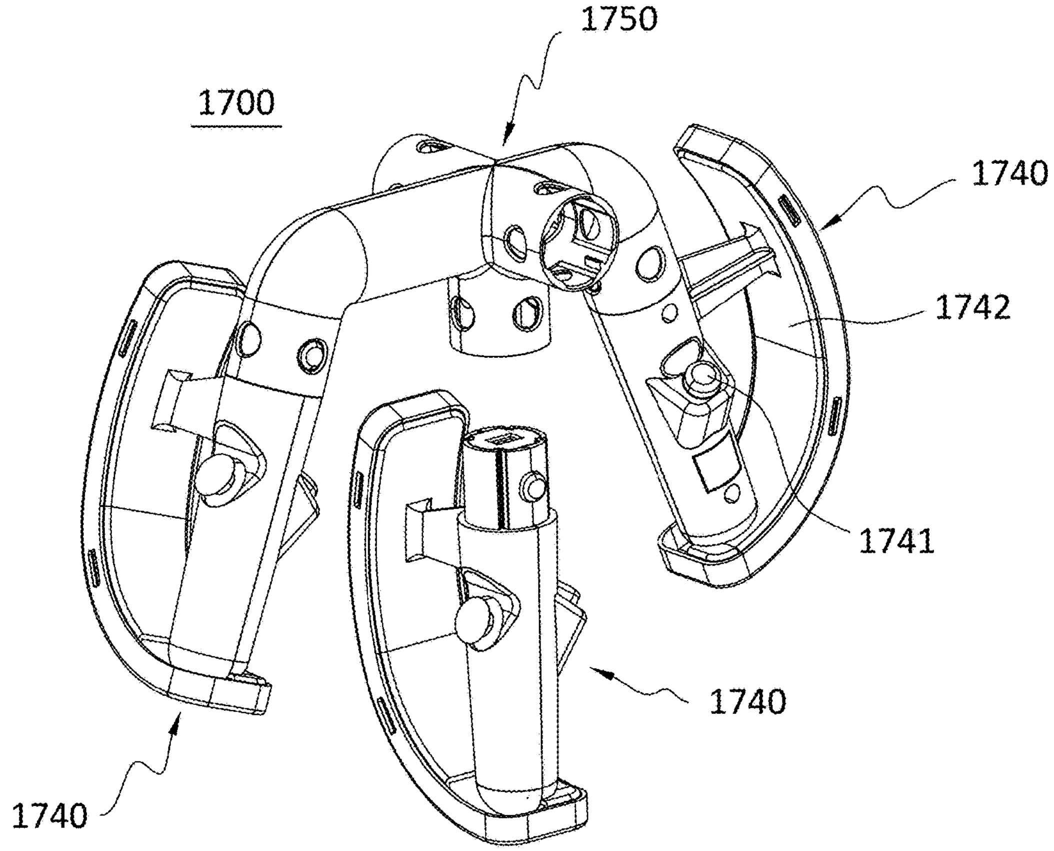
FIG. 17 illustrates a controller system, according to another embodiment.

Turning ahead in the drawings, FIG. 17 illustrates a controller system 1700, according to another embodiment. Controller system 1700 can include three controllers 1740 and a bridge 1750, which can be similar to the controller elements and bridge elements described above. Controllers 1740 can include one or more input controls 1741 and a shield 1742. Controllers 1740 can be attached to bridge 1750, such as by using connectors similar or identical to the connectors described above. Controllers 1740 can have various different configurations, which can simulate various different types of weapons, tools, etc.

Figure 18:
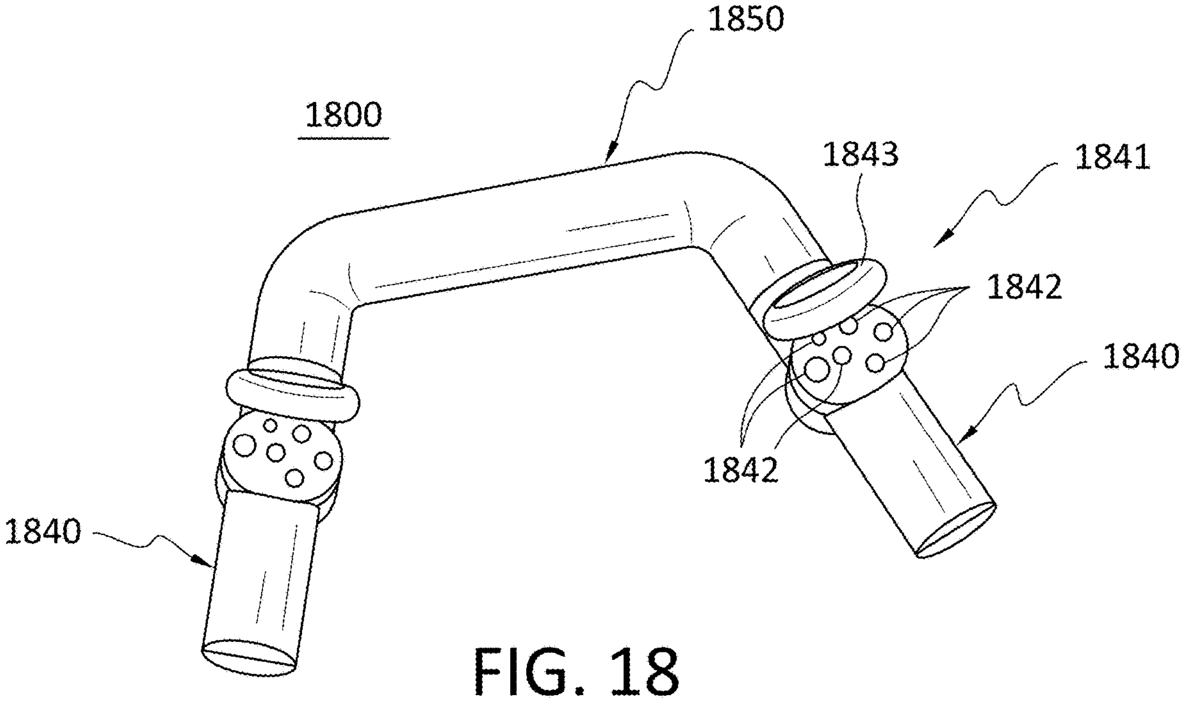
FIG. 18 illustrates a controller system, according to another embodiment.

Turning ahead in the drawings, FIG. 18 illustrates a controller system 1800, according to another embodiment. Controller system 1800 can include two controllers 1840 and a bridge 1850, which can be similar to the controller elements and bridge elements described above. Controllers 1840 can include various different input controls, such as input controls 1841, which can include various buttons 1842 and a movable loop 1843. Input controls 1841 can include other suitable input controls in other suitable configurations.

Figure 19:
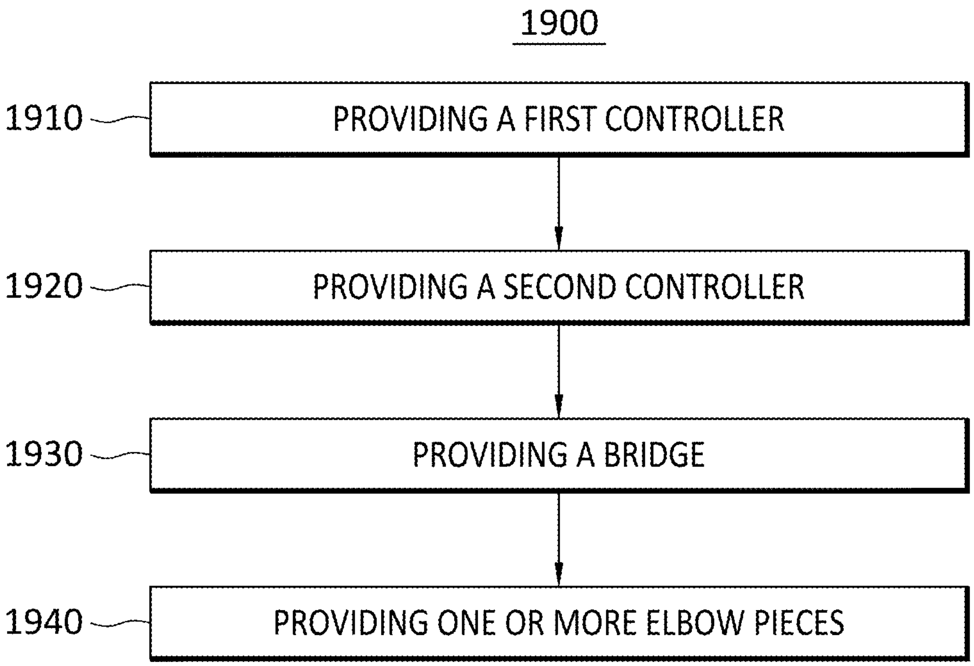
FIG. 19 illustrates a flow chart for an embodiment of a method of providing a controller system, according to another embodiment.

Turning ahead in the drawings, FIG. 19 illustrates a flow chart for an embodiment of a method 1900 of providing a controller system, according to another embodiment. Method 1900 is merely exemplary and is not limited to the embodiments presented herein. Method 1900 can be employed in many different embodiments or examples not specifically depicted or described herein. In some embodiments, the procedures, the processes, and/or the activities of method 1900 can be performed in the order presented. In other embodiments, the procedures, the processes, and/or the activities of the method 1900 can be performed in any other suitable order. In still other embodiments, one or more of the procedures, the processes, and/or the activities in method 1900 can be combined or skipped. The controller system can be similar or identical to controller system 600 (FIGS. 6A-6D), controller system 700 (FIGS. 7A-7E), controller system 1420 (FIG. 14), controller system 1600 (FIG. 16A), controller system 1700 (FIG. 17), and/or controller system 1800 (FIG. 18).

Referring to FIG. 19, method 1900 can include a block 1910 of providing a first controller comprising one or more input controls and a connector. The first controller can be similar or identical to controllers 400 (FIG. 4), controllers 1040 (FIGS. 10A-10D), controller system 1420 (FIG. 14), controller 1640 (FIG. 16A), controller 1740 (FIG. 17), and/or controller 1840 (FIG. 18). The input controls can be similar or identical to two dimensional input 401 (FIG. 4), one dimensional input 402 (FIG. 4), input controls 1841 (FIG. 18), buttons 1842 (FIG. 18) and/or movable loop 1843 (FIG. 18). The connector can be similar or identical to locking connector 403 (FIG. 4), tab 1045 (FIGS. 10A-10D), and/or connector 1641 (FIGS. 16A, 16C).

In a number of embodiments, method 1900 also can include a block 1920 of providing a second controller comprising one or more input controls and a connector. The second controller can be similar or identical to controllers 400 (FIG. 4), controllers 1040 (FIGS. 10A-10D), controller system 1420 (FIG. 14), controller 1640 (FIG. 16A), controller 1740 (FIG. 17), and/or controller 1840 (FIG. 18). The input controls can be similar or identical to two dimensional input 401 (FIG. 4), one dimensional input 402 (FIG. 4), input controls 1841 (FIG. 18), buttons 1842 (FIG. 18) and/or movable loop 1843 (FIG. 18). The connector can be similar or identical to locking connector 403 (FIG. 4), tab 1045 (FIGS. 10A-10D), and/or connector 1641 (FIGS. 16A, 16C).

In several embodiments, method 1900 can additionally include a block 1930 of providing a bridge comprising a first connector at a first end of the bridge, a second connector at a second end of the bridge, and one or more hub connectors between the first end and the second end of the bridge. The bridge can be similar or identical to bridge 500 (FIG. 5), bridge 1050 (FIGS. 10A-10D), bridge 1650 (FIG. 16A), bridge 1750 (FIG. 17), and/or bridge 1850 (FIG. 18). The first connector can be similar or identical to locking connector 501 (FIG. 5), locking connector 711 (FIGS. 7A-7E, 8), opening 1056 (FIGS. 10A-10D), and/or connector 1651 (FIGS. 16A-16B). The second connector can be similar or identical to locking connector 502 (FIG. 5), locking connector 712 (FIGS. 7A-7E, 8), opening 1056 (FIGS. 10A-10D), and/or connector 1651 (FIGS. 16A-16B). The one or more hub connectors can be similar or identical to locking connectors 503-505 (FIG. 5), locking connectors 713-714 (FIGS. 7A-7E, 8), and/or opening 1056 (FIGS. 10A-10D). In many embodiments, each of the first connector, the second connector, and the one or more hub connectors are a first connector type. Each of the connectors of the first controller and the second controller are a second connector type configured to connect in a positionally secure manner with the first connector type. The first connector type can be similar or identical to one of male connector type 931 (FIG. 9F) or female connector type 932 (FIG. 9F), and the second connector type can be similar or identical to the other one of male connector type 931 (FIG. 9F) or female connector type 932 (FIG. 9F).

In a number of embodiments, method 1900 optionally can include a block 1940 of providing one or more elbow pieces. The elbow pieces can be similar or identical to elbow pieces 720 (FIGS. 7A, 7D, 7E, 9A).

Figure 20:
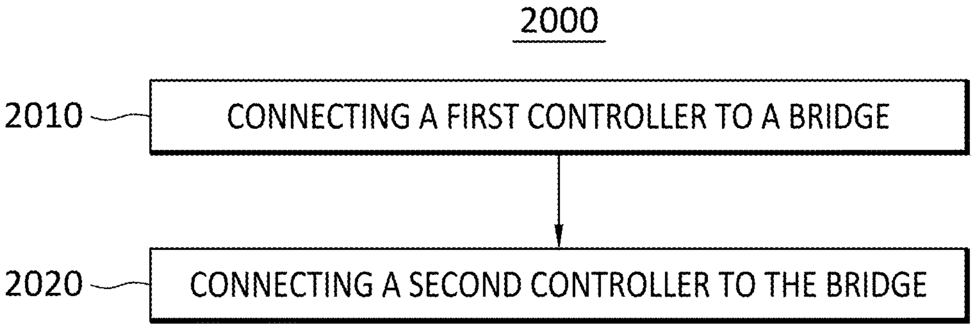
FIG. 20 illustrates a flow chart for an embodiment of a method of using a controller system, according to another embodiment.

Turning ahead in the drawings, FIG. 20 illustrates a flow chart for an embodiment of a method 2000 of using a controller system, according to another embodiment. Method 2000 is merely exemplary and is not limited to the embodiments presented herein. Method 2000 can be employed in many different embodiments or examples not specifically depicted or described herein. In some embodiments, the procedures, the processes, and/or the activities of method 2000 can be performed in the order presented. In other embodiments, the procedures, the processes, and/or the activities of the method 2000 can be performed in any other suitable order. In still other embodiments, one or more of the procedures, the processes, and/or the activities in method 2000 can be combined or skipped. The controller system can be similar or identical to controller system 600 (FIGS. 6A-6D), controller system 700 (FIGS. 7A-7E), controller system 1420 (FIG. 14), controller system 1600 (FIG. 16A), controller system 1700 (FIG. 17), and/or controller system 1800 (FIG. 18).

Referring to FIG. 20, method 2000 can include a block 2010 of connecting a first controller to a bridge. The first controller can be similar or identical to controllers 400 (FIG. 4), controllers 1040 (FIGS. 10A-10D), controller system 1420 (FIG. 14), controller 1640 (FIG. 16A), controller 1740 (FIG. 17), and/or controller 1840 (FIG. 18). The bridge can be similar or identical to bridge 500 (FIG. 5), bridge 1050 (FIGS. 10A-10D), bridge 1650 (FIG. 16A), bridge 1750 (FIG. 17), and/or bridge 1850 (FIG. 18). The first controller can include one or more input controls and a connector. The input controls can be similar or identical to two dimensional input 401 (FIG. 4), one dimensional input 402 (FIG. 4), input controls 1841 (FIG. 18), buttons 1842 (FIG. 18) and/or movable loop 1843 (FIG. 18). The connector can be similar or identical to locking connector 403 (FIG. 4), tab 1045 (FIGS. 10A-10D), and/or connector 1641 (FIGS. 16A, 16C). The bridge can include a first connector at a first end of the bridge, a second connector at a second end of the bridge, and one or more hub connectors between the first end and the second end of the bridge. The first connector can be similar or identical to locking connector 501 (FIG. 5), locking connector 711 (FIGS. 7A-7E, 8), opening 1056 (FIGS. 10A-10D), and/or connector 1651 (FIGS. 16A-16B). The second connector can be similar or identical to locking connector 502 (FIG. 5), locking connector 712 (FIGS. 7A-7E, 8), opening 1056 (FIGS. 10A-10D), and/or connector 1651 (FIGS. 16A-16B). The one or more hub connectors can be similar or identical to locking connectors 503-505 (FIG. 5), locking connectors 713-714 (FIGS. 7A-7E, 8), and/or opening 1056 (FIGS. 10A-10D).

In a number of embodiments, method 2000 also can include a block 2020 of connecting a second controller to the bridge. The second controller can be similar or identical to controllers 400 (FIG. 4), controllers 1040 (FIGS. 10A-10D), controller system 1420 (FIG. 14), controller 1640 (FIG. 16A), controller 1740 (FIG. 17), and/or controller 1840 (FIG. 18). The second controller can include one or more input controls and a connector. The input controls can be similar or identical to two dimensional input 401 (FIG. 4), one dimensional input 402 (FIG. 4), input controls 1841 (FIG. 18), buttons 1842 (FIG. 18) and/or movable loop 1843 (FIG. 18). The connector can be similar or identical to locking connector 403 (FIG. 4), tab 1045 (FIGS. 10A-10D), and/or connector 1641 (FIGS. 16A, 16C). In many embodiments, each of the first connector, the second connector, and the one or more hub connectors are a first connector type. Each of the connectors of the first controller and the second controller are a second connector type configured to connect in a positionally secure manner with the first connector type. The first connector type can be similar or identical to one of male connector type 931 (FIG. 9F) or female connector type 932 (FIG. 9F), and the second connector type can be similar or identical to the other one of male connector type 931 (FIG. 9F) or female connector type 932 (FIG. 9F).

Although the game controller system and related methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-20 may be modified, and that the foregoing discussion of certain of these embodiments does not necessarily represent a complete description of all possible embodiments. For example, one or more of the elements of FIG. 4 can be swapped with, interchanged, modified, or added to other embodiments described herein. As another example, one or more of the procedures, processes, or activities of FIGS. 19-20 may include different procedures, processes, and/or activities and be performed in many different orders, and/or one or more of the procedures, processes, or activities of FIGS. 19-20 may include one or more of the procedures, processes, or activities of another different one of FIGS. 19-20.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A controller system comprising:

a first controller comprising one or more input controls and a first controller connector;

a second controller comprising one or more input controls and a second controller connector; and a bridge comprising a first connector at a first end of the bridge, a second connector at a second end of the bridge, and one or more hub connectors between the first end and the second end of the bridge, wherein:

each of the first connector, the second connector, and the one or more hub connectors are a first connector type;

each of the first controller connectors of the first controller and the second controller connector of the second controller are a second connector type configured to connect in a positionally secure manner with the first connector type; and the bridge comprises (i) a first bend between the first end of the bridge and the one or more hub connectors and (ii) a second bend between the second end of the bridge and the one or more hub connectors.

2. The controller system of claim 1, wherein:

the first controller is configured to be positionally secured to the bridge by the first controller connector of the first controller being directly or indirectly secured to any one of the first connector, the second connector, or any one of the one or more hub connectors; and the second controller is configured to be positionally secured to the bridge by the second controller connector of the second controller being directly or indirectly secured to any one of the first connector, the second connector, or any one of the one or more hub connectors of the bridge.

3. The controller system of claim 1, wherein the first connector and the second connector of the bridge face opposite from each other.

4. The controller system of claim 1, wherein the one or more hub connectors of the bridge comprise two hub connectors facing opposite from each other.

5. The controller system of claim 4, wherein the one or more hub connectors of the bridge comprise a third hub connector facing orthogonal to the two hub connectors.

6. The controller system of claim 1, wherein the one or more hub connectors of the bridge are positioned closer to the first end of the bridge than the second end of the bridge.

7. The controller system of claim 1, wherein the first connector type and the second connector type are operable to be rotated and lock into at least 8 different positions with respect to each other.

8. The controller system of claim 1, wherein:

a first one of the first connector type or the second connector type comprises a rotational dial;

a second one of the first connector type or the second connector type that is different from the first one comprises a rotational base; and the rotational dial is operable, when the rotational base is inserted inside the rotational dial, to be rotated to secure the second one to the first one and prevent the second one from rotating relative to the first one.

9. The controller system of claim 8, wherein:

the rotational base comprises a plurality of tabs; and the rotational dial comprises a plurality of slots configured to receive the plurality of tabs in multiple different rotational orientations.

10. The controller system of claim 8, wherein:

the second one further comprises a rotational cam a rotational lock;

the rotational lock is spring biased toward the rotational cam; and the rotation base and the rotational lock are operable to rotate and lock into at least 8 different positions with respect to the rotational cam.

11. The controller system of claim 1, wherein the controller system is configured to allow at least one of the first controller or the second controller to be attached to and detached from the bridge without viewing the controller system.

12. The controller system of claim 1, wherein:

the first connector type comprises a first array of magnets having a first polarity;

the second connector type comprises a second array of magnets having a second polarity that is opposite the first polarity;

at least one of the first connector type or the second connector type comprises a compression spring configured to slow magnetic coupling between the first connector type and the second connector type; and the first connector type and the second connector type are configured to lock in positionally secure manner by twisting the second connector type relative to the first connector type into a detent when the second array of magnets is magnetically coupled to the first array of magnets.

13. The controller system of claim 1, wherein the controller system is configured to receive an updated configuration that updates a mapping of input signals to functions.

14. A controller system comprising:

a first controller comprising one or more input controls and a first controller connector;

a second controller comprising one or more input controls and a second controller connector;

a bridge comprising a first connector at a first end of the bridge, a second connector at a second end of the bridge, and one or more hub connectors between the first end and the second end of the bridge, wherein each of the first connector, the second connector, and the one or more hub connectors are a first connector type, and wherein each of the first controller connector of the first controller and the second controller connector of the second controller are a second connector type configured to connect in a positionally secure manner with the first connector type; and a first elbow piece comprising a first connector having the first connector type at a first end of the first elbow piece and a second connector having the second connector type at a second end of the first elbow piece, wherein:

the first elbow piece comprises a bend between the first end and the second end of the first elbow piece.

15. The controller system of claim 14, wherein the first controller is configured to be positionally secured to the bridge by (i) the first controller connector of the first controller being secured to the first connector of the first elbow piece and (ii) the second connector of the first elbow piece being directly or indirectly secured to the bridge.

16. The controller system of claim 15, wherein the first controller is configured to be positionally secured to the bridge by the second connector of the first elbow piece being directly secured to any one of the first connector, the second connector, or any one of the one or more hub connectors of the bridge.

17. The controller system of claim 14, further comprising:

a second elbow piece comprising a first connector having the first connector type at a first end of the second elbow piece and a second connector having the second connector type at a second end of the second elbow piece wherein:

the second elbow piece comprises a bend between the first end and the second end of the second elbow piece.

18. The controller system of claim 17, wherein the first controller is configured to be positionally secured to the bridge by (i) the first controller connector of the first controller being secured to the first connector of the first elbow piece, (ii) the second connector of the first elbow piece being directly secured to the first connector of the second elbow piece, and (iii) the second connector of the second elbow piece being directly secured to any one of the first connector, the second connector, or any one of the one or more hub connectors of the bridge.

19. A controller system comprising:

a first controller comprising one or more input controls and a first controller connector;

a second controller comprising one or more input controls and a second controller connector; and a bridge comprising a first connector at a first end of the bridge, a second connector at a second end of the bridge, and one or more hub connectors between the first end and the second end of the bridge, wherein:

each of the first connector, the second connector, and the one or more hub connectors are a first connector type;

each of the first controller connector of the first controller and the second controller connector of the second controller are a second connector type configured to connect in a positionally secure manner with the first connector type; and the controller system is configured to be calibrated to adjust a motion scale of the controller system.

20. A method of providing a controller system, comprising:

providing a first controller comprising one or more input controls and a first controller connector;

providing a second controller comprising one or more input controls and a second controller connector; and providing a bridge comprising a first connector at a first end of the bridge, a second connector at a second end of the bridge, and one or more hub connectors between the first end and the second end of the bridge, wherein:

each of the first connector, the second connector, and the one or more hub connectors are a first connector type;

each of the first controller connector of the first controller and the second controller connector of the second controller are a second connector type configured to connect in a positionally secure manner with the first connector type; and the bridge comprises (i) a first bend between the first end of the bridge and the one or more hub connectors and (ii) a second bend between the second end of the bridge and the one or more hub connectors.

21. A method of using a controller system, comprising:

connecting a first controller to a bridge, wherein the first controller comprises one or more input controls and a first controller connector, and wherein the bridge comprises a first connector at a first end of the bridge, a second connector at a second end of the bridge, and one or more hub connectors between the first end and the second end of the bridge;

connecting a second controller to the bridge, wherein the second controller comprises one or more input controls and a second controller connector, wherein each of the first connector, the second connector, and the one or more hub connectors are a first connector type, wherein each of the first controller connector of the first controller and the second controller connector of the second controller are a second connector type configured to connect in a positionally secure manner with the first connector type, and wherein the bridge comprises (i) a first bend between the first end of the bridge and the one or more hub connectors and (ii) a second bend between the second end of the bridge and the one or more hub connectors.

* * * * *